US008176693B2

(12) United States Patent
Abbott et al.

(10) Patent No.: US 8,176,693 B2
(45) Date of Patent: May 15, 2012

(54) PHOTOVOLTAIC MOUNTING SYSTEM WITH LOCKING CONNECTORS, ADJUSTABLE RAIL HEIGHT AND HINGE LOCK

(75) Inventors: Ronald E. Abbott, La Rue, OH (US); Perry L. Kent, Mansfield, OH (US); Ryan D. Abbott, La Rue, OH (US)

(73) Assignee: Robert W. Mitchell, Marango, OH (US)

( * ) Notice: Subject to any disclaimer, the term of this patent is extended or adjusted under 35 U.S.C. 154(b) by 0 days.

(21) Appl. No.: 12/468,490

(22) Filed: May 19, 2009

(65) Prior Publication Data
US 2009/0282755 A1 Nov. 19, 2009

Related U.S. Application Data

(60) Provisional application No. 61/054,296, filed on May 19, 2008, provisional application No. 61/090,055, filed on Aug. 19, 2008.

(51) Int. Cl.
*E04D 13/18* (2006.01)
(52) U.S. Cl. ........... 52/173.3; 52/173.1; 52/200; 52/202
(58) Field of Classification Search ................. 52/173.3, 52/465, 466, 467, 464, 475.1, 772, 774, 775, 52/780, 781, 173.1, 200, 202
See application file for complete search history.

(56) References Cited

U.S. PATENT DOCUMENTS

| | | | |
|---|---|---|---|
| 2,673,632 A | 3/1954 | Stiranka | |
| 4,426,999 A | 1/1984 | Evans et al. | |
| 4,977,646 A | 12/1990 | McCraw | |
| 5,232,518 A * | 8/1993 | Nath et al. | 136/251 |
| 5,706,617 A * | 1/1998 | Hirai et al. | 52/173.3 |
| 6,056,283 A | 5/2000 | Gage et al. | |
| 6,065,255 A | 5/2000 | Stern et al. | |
| 6,360,491 B1 | 3/2002 | Ullman | |
| D496,248 S | 9/2004 | Liebendorfer | |
| D496,249 S | 9/2004 | Liebendorfer | |
| 6,959,517 B2 * | 11/2005 | Poddany et al. | 52/173.3 |
| 7,260,918 B2 | 8/2007 | Liebendorfer | |
| 7,845,120 B2 * | 12/2010 | Thome et al. | 52/144 |
| 7,987,641 B2 * | 8/2011 | Cinnamon | 52/173.3 |
| 2003/0070368 A1 * | 4/2003 | Shingleton | 52/173.3 |
| 2004/0163338 A1 * | 8/2004 | Liebendorfer | 52/173.1 |
| 2006/0156651 A1 | 7/2006 | Genschorek | |
| 2008/0010915 A1 * | 1/2008 | Liebendorfer | 52/173.3 |

* cited by examiner

FOREIGN PATENT DOCUMENTS
JP 3212629 9/1991
WO 2008/124158 10/2008

*Primary Examiner* — Jeanette E Chapman
*Assistant Examiner* — James Buckle, Jr.
(74) *Attorney, Agent, or Firm* — Mueller Law, LLC; Jerry K. Mueller, Jr.

(57) ABSTRACT

A cam-actuated connection device joins rail mounting members of a photovoltaic panel array. The connection device slides within channels of mounting members until the members are in a properly positioned grid. When in position, the connection device is rotated to lock the mounting members in a rigid grid network. The connecting device can be subsequently loosened, repositioned and locked into position. The rail-mounting members create a grid for installation of multiple PV panels. The mounting rail allows the unit to remain relatively compact in nature but still covers a wide range of PV panel thicknesses. The rail system has a hinged connection with the mounting rail that allows an installer to assemble the module in a near perpendicular fashion to the mounting rail, make the required electrical connections and then lower the PV module into its working position. The unit is then locked into its working position.

1 Claim, 36 Drawing Sheets

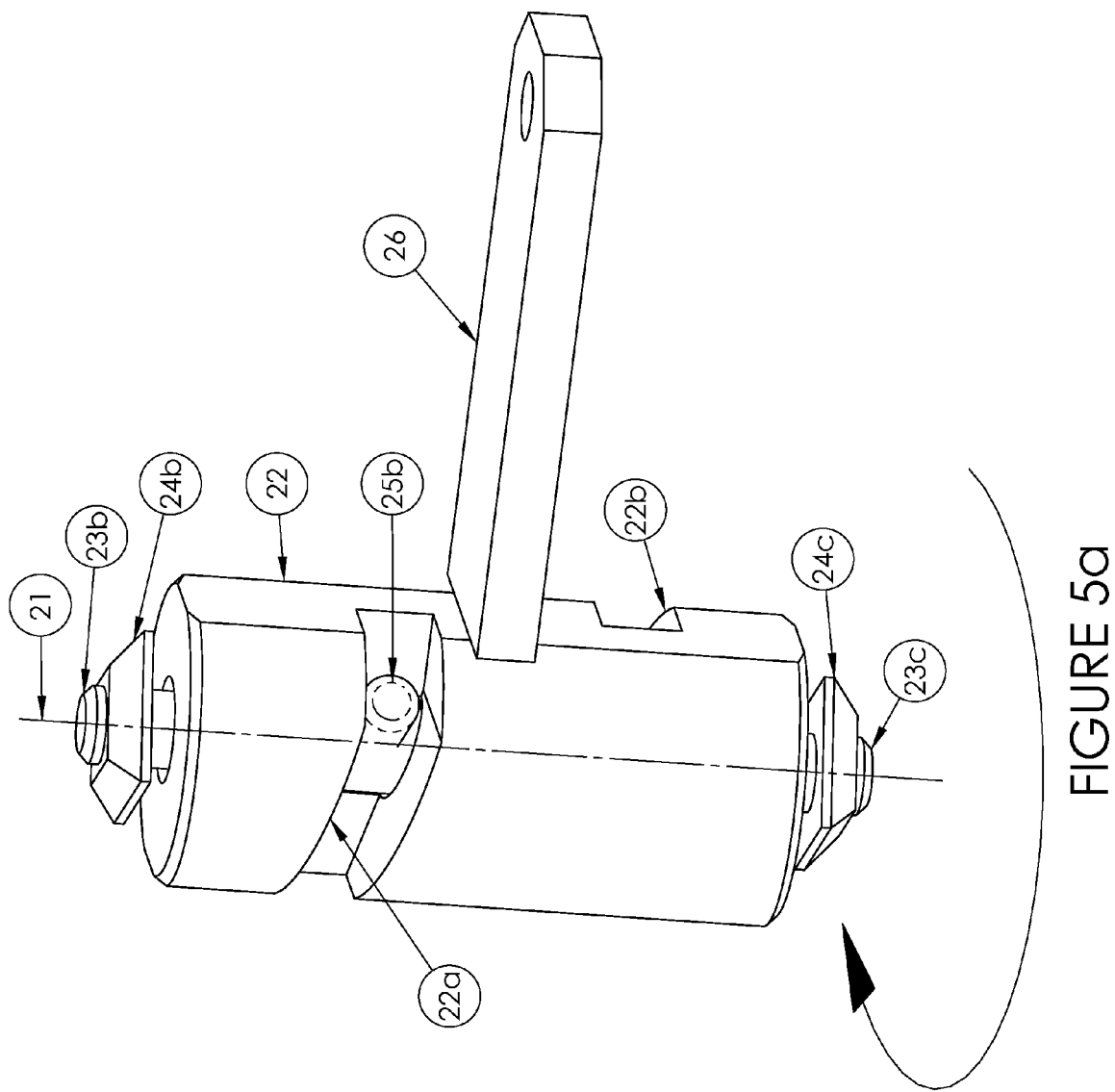

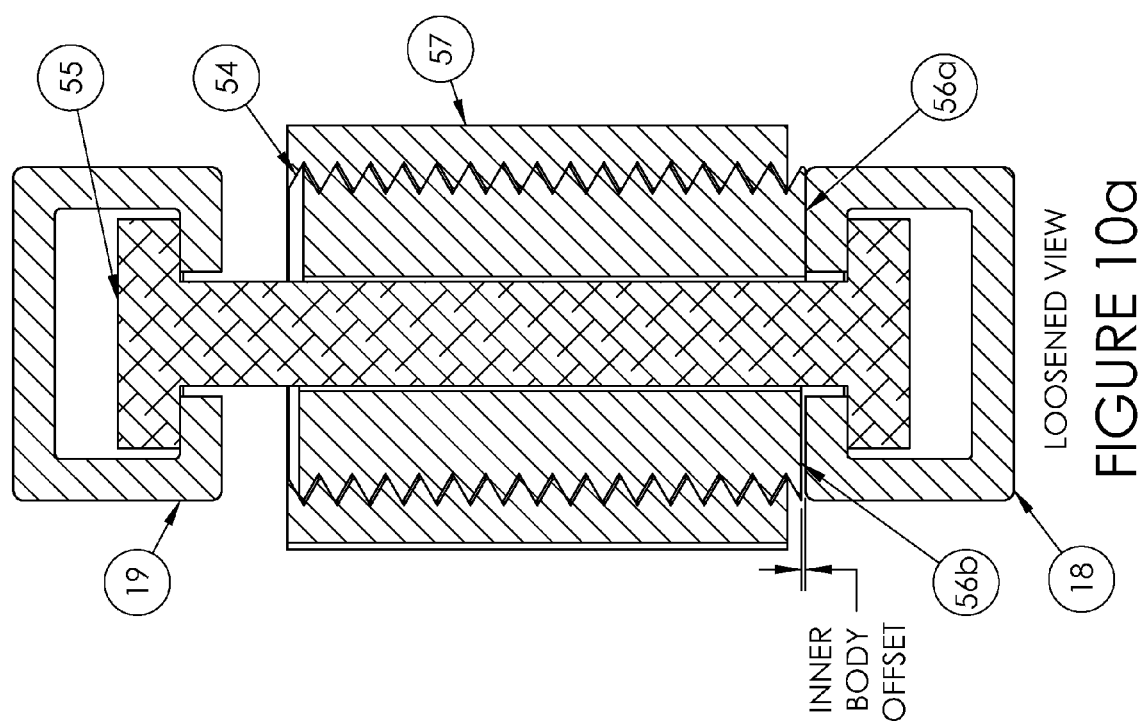
FIGURE 10a LOOSENED VIEW

TIGHTENED VIEW

PHOTOVOLTAIC MOUNTING SYSTEM WITH LOCKING CONNECTORS, ADJUSTABLE RAIL HEIGHT AND HINGE LOCK

CROSS-REFERENCES TO RELATED APPLICATIONS

This application claims the benefit of U.S. Provisional Application No. 61/054,296 filed May 19, 2008, and U.S. Provisional Application No. 61/090,055 filed Aug. 19, 2008, both of which are incorporated herein by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to the mounting of photovoltaic panels on rooftops and other structures, and more particularly to hardware to facilitate the mounting of the panels.

2. Description of the Related Art

Photovoltaic (herein, "PV") mounting grids are commonly used to mount PV panel arrays to building structures, ground mounted systems and a large variety of alternate configurations. In one common configuration, a rail and a cleat are mounted, for example to a rooftop of a home, and the panel arrays are mounted thereto.

In general the PV industry is accustomed to mounting each rail and cleat individually using various mechanical fasteners such as nuts, bolts and washers. Each connection point is carefully measured and set in place and manually tightened, typically using common tools such as wrenches, sockets, ratchets and screwdrivers. The conventional methods of installation generally consume many man-hours of installation labor and must be placed in precise locations to accommodate the specific PV panels supplied for the installation. This is a project that requires significant skill and precision.

If it becomes desirable or economical to replace the existing PV panels with a more technologically advanced system, the existing grid mount must, in general, be removed. This is either done in part or in whole to accommodate the newer panels. This operation in general will take as long as or longer than the original installation when conventional mounting systems are used. The need exists for an improved PV mounting system.

BRIEF SUMMARY OF THE INVENTION

The apparatuses and methods disclosed herein are more cost-effective means and method of installing PV panel arrays. The present invention includes a cam-actuated connector to fasten perpendicular mounting components used to install PV panels, and a PV panel mounting rail that allows slide-in or drop-in installation and equalized clamping action for securing the PV panels in place. A parallel grid formed by the mounting rails and cam connectors in turn allows the PV panels to be slid or dropped into position while being electrically connected as they are installed.

In the absence of bolts, nuts and other standard fasteners, the cam-actuated device is inserted in two crossing frame members during installation of a photovoltaic system. The photovoltaic mounting system in general consists of an extruded beam member mounted in line with the roof, ground support member and/or rafter. The system also includes an extruded perpendicular crossing member, but could be mounted at various angles other than perpendicular. The crossing joint is locked in tension using the cam-actuated connector. Multiple crossing extrusions and connectors make up a complete mounting grid. The mounting grid in turn supports a plurality of photovoltaic panels, which are conventional and widely known.

The apparatus provides quick and secure connections that, during the process of connecting the mounting grid components, allow the installer to expedite the assembly of the PV panel mounting structure. The cam connector allows the installer the flexibility to position and reposition the grid as needed to achieve the final mounting configuration quickly. When the frame is determined to be in the proper position, the cam connector is easily turned to lock it in the final tensioned position. This and other unique design features of the cam-actuated connector and equalized clamping action rail member system are estimated to reduce installation time by up to 60 percent over conventional practices. The invention also provides a self-locking feature that, while being tightened into its working condition, allows the split inner barrel of the cam actuator to tighten in a manner that forces the cam surfaces into opposite direction, thereby firmly locking the device in position.

The time saving aspects of the invention are many. Primary among them is the ability for individual connectors to be attached in a series of chained connectors using a common tightening device such as a tensioning jack or cam arm. In addition, the ability of the cam connector to be removed, repositioned and reconnected many times over the life of the photovoltaic system uniquely suits the system for future PV enhancements. With advancements in photovoltaic efficiency, this capability allows panels to be replaced with new panels that may or may not be of the same physical size. The cam-actuated fasteners are easily loosened, repositioned and retightened in accordance with the requirements of the new photovoltaic array. There is no limit to the number of this type of system change.

This invention is generally intended for use with sloped roof mount and ground-mounted photovoltaic systems, but it may also be applied to any other form of PV installation including, but not limited to, pole mount, wall mount, flat roof and automatic sun tracking systems. The cam-actuated attachment device may be used with several versions of commercially available extrusions as well as proprietary extruded sections. The cam-actuated fastener may also be used with fabricated frameworks.

A further understanding of the unique mounting system can be gained by envisioning the extruded, equalized clamping-action mounting rail as a system of generally parallel elevated channels. The channels include an extruded assembly with multiple components linked in a manner that allows for uniform clamping across the entire PV array. The lower extrusion comprises the basic mounting support for the PV panel frames. Extrusions may be of various sizes and shapes but in general provide a ledge for the panel frame to rest, one panel frame on each side, with one ledge providing the lower support for one row of panels while the opposite ledge provides support for the adjacent row, if present.

An upper clamping cap component is maintained in a parallel fashion to the lower ledge base extrusion. The parallel orientation of the cap member is maintained by an integral linkage mechanism, which may be a set of links or cam members. The movement of the parallel linkage thereby pivots the clamping cap to allow a wider space between the cap and ledge base member or to provide a closer proximity between the cap and ledge. The linkage preferably works in synchronous order to impose uniform clamping action along the entire row of PV panels. The cap member is a loose piece with a single or multiple tracks that engage with the mating cap mounting section that has multiple tracks to hold the cap member at various distances with respect to the mounting ledge. The cap member may be removed by sliding in a parallel (horizontal) relation to the mounting rail to allow the PV modules to be placed in position from above the rail. After the PV modules are installed, the cap member is moved back into position at the desired gap spacing.

A single actuator located near the end of each of the mounting rails generates the required force to pull the clamping cap and linkage into the desired clamped position once the PV panels have been installed. The single actuator is referred to as a "jack" because it applies a longitudinal force. The jack is preferably a threaded mechanism that will be actuated with a tool such as a wrench or ratchet/socket combination. In various arrangements the jack may also be moved into position by hand using a lever or a handle. The jack mechanism may also be a cam-type lever that pulls the cap and linkage into its clamped position.

A departure from the above-mentioned mounting rail is an alternative rail mounting extrusion designed to create a removable hinged connection between the rail and the mating extrusion that is affixed to, or extruded into, the PV module frame. The male/female connection allows the PV module to be inserted into the mounting rail track in a near perpendicular position allowing the wire leads affixed to the backs of each PV module to be interconnected. This then allows the modules to be lowered into their working position. Once the PV modules are lowered into their working position they are locked into position with a fastener such as a screw or another extrusion that slides into the mounting rail for positively locking the entire row of PV modules in position.

It is to be noted that the mounting rail assemblies mentioned in this disclosure have been described as being made of extruded members, preferably aluminum. Each can equally be made from fabricated members of various materials, including, but not limited to, stainless steel, plastics, composite and other suitable materials. Similarly, the mounting rail assemblies can be extruded, but could also be formed using other forming processes, including, but not limited to, pultrusion, casting and drawing.

The described fastening mounting rails and clamping PV panels forms a mounting system that when used as a complete system allows for a cost-effective and labor-reducing installation package.

BRIEF DESCRIPTION OF THE SEVERAL VIEWS OF THE DRAWINGS

FIG. 5a is a view in perspective illustrating another embodiment of a grid connector utilizing a slotted support body to provide the desired cam clamping action.

FIG. 5b is a side view in section through the embodiment of FIG. 5a.

FIG. 10a is a side view in section illustrating the embodiment of FIG. 9 in a loosened configuration.

FIG. 12b' is an end view illustrating the clamping cap of FIG. 12a.

FIG. 12b" is a side view in section illustrating the clamping cap of FIG. 12a in which connecting links control the parallel motion and clamping force of the cap.

FIG. 13a is a bottom view illustrating the clamping cap of FIG. 12a.

FIG. 14b is a bottom view illustrating the embodiment of FIG. 14a.

FIG. 14c is a magnified side view of the illustration of FIG. 14a.

FIG. 16b is an end view in section illustrating the embodiment of FIG. 16a.

Figure 1:
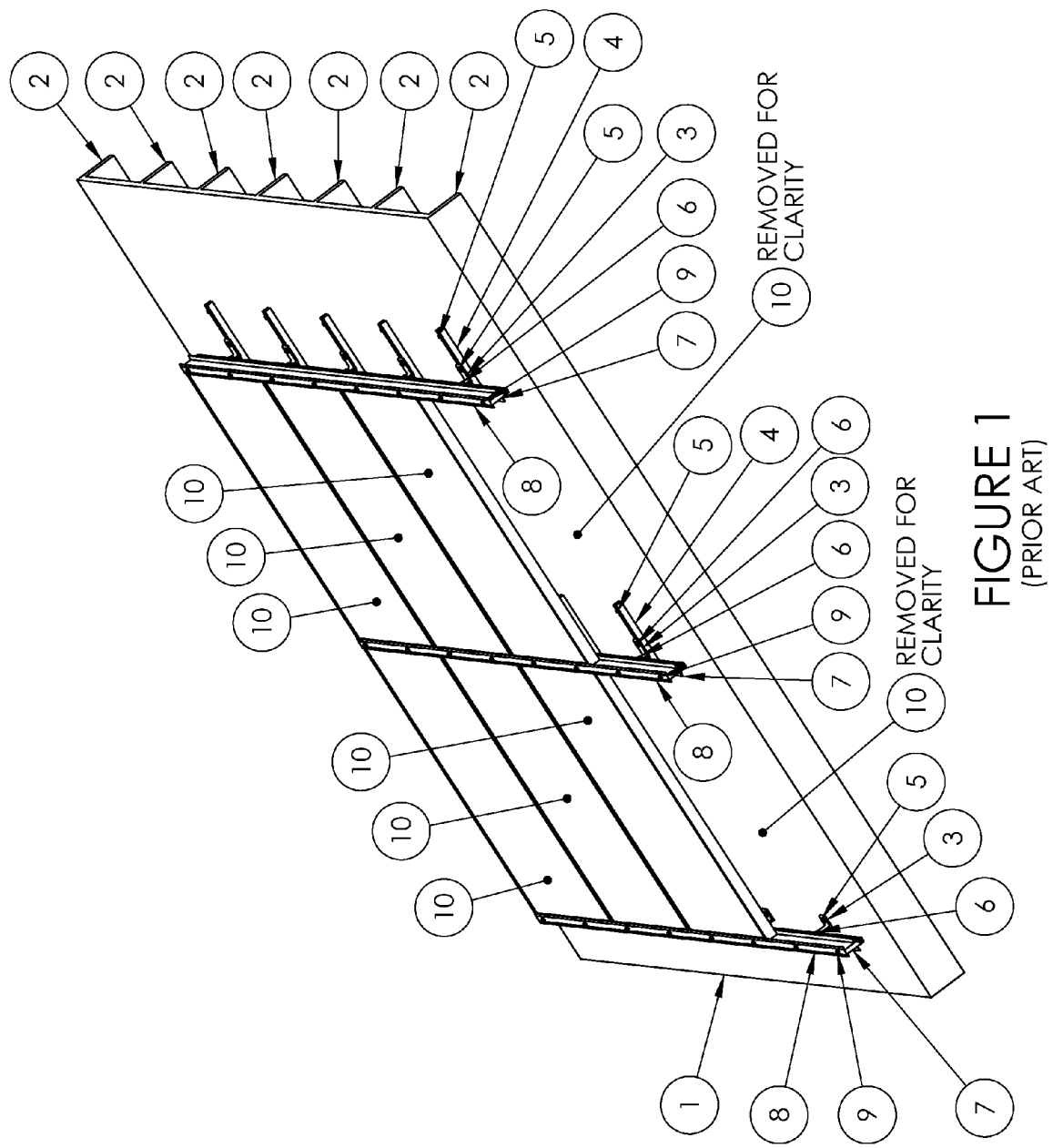
FIG. 1 is a schematic view in perspective illustrating an example of a prior art roof-mounted photovoltaic installation grid application following the current industry standard.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

Referring to FIG. 1, a portion of a conventional residential roof structure 1 is shown, and presents a common mounting medium for which the present invention is particularly suited. The portion shown in FIG. 1 is typical of a residential roof structure, having support beams over which one or more weatherproof sheets is attached, such as plywood and shingles. Of course, the roof structure 1 is merely one example of a structure to which the present invention can be mounted, as will be understood by the person having ordinary skill in the design and installation of photovoltaic electrical systems. The residential roof structure 1 is described herein, but it will be understood by the person of ordinary skill that other structures can be substituted for the structure 1, including without limitation a commercial, institutional or agricultural roof structure, a planar structure built specifically to support a PV array, a wall or ground-mounted area, or any other stable, fixed structure.

The drawing of FIG. 1 illustrates a conventional PV array using the fastening means conventionally known. The roof structure 1 has several layers, which include support structures and sealing materials such as lumber, tarpaper and shingles or metal sheeting or other roofing materials, which are conventional and not critical for the operation of the invention. Trusses or rafters 2, which are common in residential construction, provide structural support to the roof structure 1. The rafters 2 are the primary attachment member to which a typical conventional PV array is mounted, and the invention is no exception.

A conventional installation on the roof structure 1 utilizes mounting brackets, such as the L-shaped "angles" 3, the mounting channels 4, or both, to attach to the roof structure 1 and present an interface to which other portions of the mounting apparatus attach. The angles 3 and channels 4 are preferably attached to the rafters using a combination of lag screws and washers, the combination given reference numeral 5 in FIG. 1. As will be understood from the description, other fasteners, such as nails, rivets and/or adhesives, can be used instead of, or in addition to, the lag screws and washers 5.

The angles 3 and channels 4 are located on the upwardly facing surface of the roof and, if the roof is angled from horizontal, preferably extend along the roof structure 1 aligned with the vertical component of the slanted roof. Each of the angles 3 and channels 4 is preferably aligned parallel to, and directly above, a corresponding one of the rafters 2. During installation, the angles 3 and channels 4 are preferably attached to the roof structure 1 in aligned rows using the lag screw assemblies 5, and the rows are spaced apart to accommodate the width and/or length of the PV panel 10 (described below). A plurality of the angles 3 and channels 4 are spaced along the roof structure 1 as required to support the specified PV array. In a preferred embodiment, holes are drilled in a conventional manner through the roof structure 1, as needed, and the bolts are inserted therein in a conventional manner. The penetrations through the roof structure 1 are preferably sealed from leakage with a conventional and suitable sealing caulk, either prior to, or after, insertion of the bolts.

With the roof mounting hardware (the angles 3 and channels 4) in place on the roof, the base support members 7 are then attached to the mounting angles 3 using a hardware assembly 6, which is a combination mounting bolt, nut and washer. Each hardware assembly 6 is individually inserted and tightened so as to rigidly fasten the base support members 7 to the angles 3. The base support members 7, which are preferably extruded aluminum beams, are aligned transverse, and preferably perpendicular, to the channels 4. Once all the mounting bases 7 are fastened to the mounting angles 3, the PV panels 10 are individually placed in position and wired electrically to a known, conventional electrical system (not illustrated) for a PV array. Once each row of PV panels 10 is installed, a top securing member 8 is attached to the upper edge of the base support members 7 using a plurality of bolt and washer assemblies 9. Each sequential row of PV panels 10 is installed in a similar manner.

Figure 2:
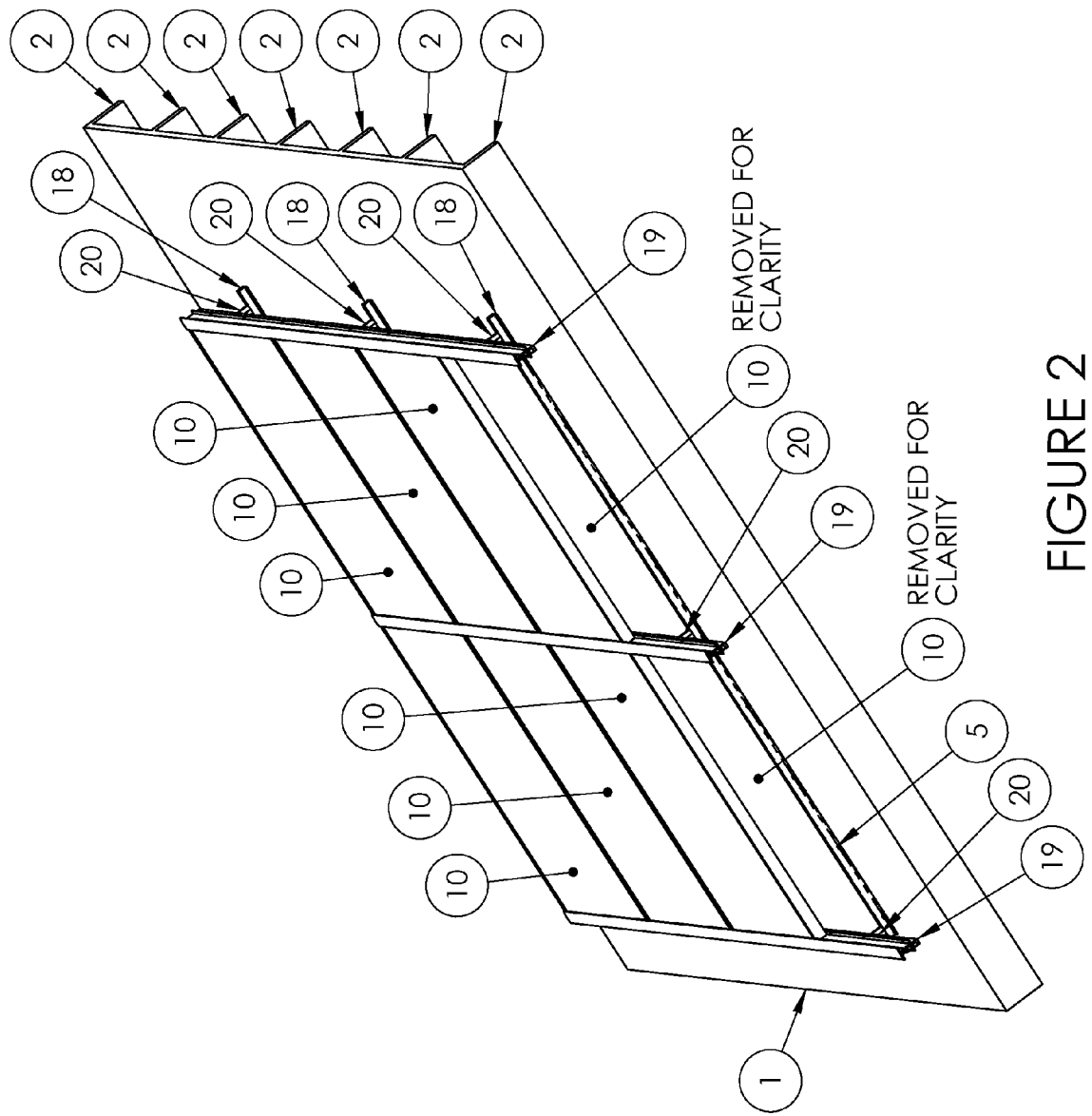
FIG. 2 is a schematic view in perspective illustrating an embodiment of the present invention in an operable configuration.

FIG. 2 shows an embodiment of the present invention that demonstrates the unique ability of the inventive mounting system to simplify and expedite mounting of a PV array. The FIG. 2 structure is shown mounted to the same roof structure 1 as depicted in the prior art system of FIG. 1. In the preferred embodiment, attachment to the rafters 2 is made by aligning a full length mounting channel 18, or multiple shorter mounting channels, aligned with a corresponding rafter 2 and attaching to the rafter 2 using a plurality of lag screw assemblies 5, or any known substitute as in the prior art described in relation to FIG. 1. A plurality of the mounting channels 18 are spaced across the roof structure 1 according to the required load calculations in much the same manner as the channels 4 of the FIG. 1 structure. In most applications, this will require fewer attachments than the conventional means, because weight (load) is generally spread in a more even manner with the mounting channels 18. The mounting channels 18 are preferably aluminum extrusions having a lip (see FIG. 3) extending laterally from one side of the structure through which a lag bolt can be extended after a hole is drilled. Additionally, an upwardly facing groove is formed between two uprights with inwardly extending lips that form a shape that is advantageous for attachment of grid connectors 20.

The inwardly extending lips resist the upward withdrawal of clamp bases (described below) inserted into the end of the channel.

After the mounting channels 18 are mounted to the roof, a plurality of grid connectors 20 are inserted into the upwardly facing grooves in the mounting channels 18. The quantity of connectors 20 matches the number of connecting joints created by the crossing mounting rail assemblies 19, which are described below. A similar, downwardly facing groove in the mounting rail assembly 19 is next slid onto the grid connectors 20 across the roof structure 1, preferably substantially perpendicular to the mounting channels 18 as shown in FIG. 2. The interaction between the grid connectors 20 and the mounting channels 18 and the mounting rail assembly 19 is described in greater detail below. In summary, the channels 18 mount to the roofing structure 1, and the mounting rail assemblies 19 mount to the PV array, and the connectors 20 mount the channels 18 and 19 together.

Once the mounting rail assemblies 19 are in the proper location relative to the mounting channels 18, the grid connectors 20 are locked in position by rotating the main bodies of each about their rotational axes 21 as described in more detail below. This locks the grid connectors 20 to both the mounting channels 18 and the mounting rail assemblies 19. With the PV panels 10 assembled in position as shown in FIG. 2, the installer tightens the mounting rail assembly 19 to the PV panels as explained later in this description, and electrically connects the panels to an electrical management system that is conventional.

Figure 3:
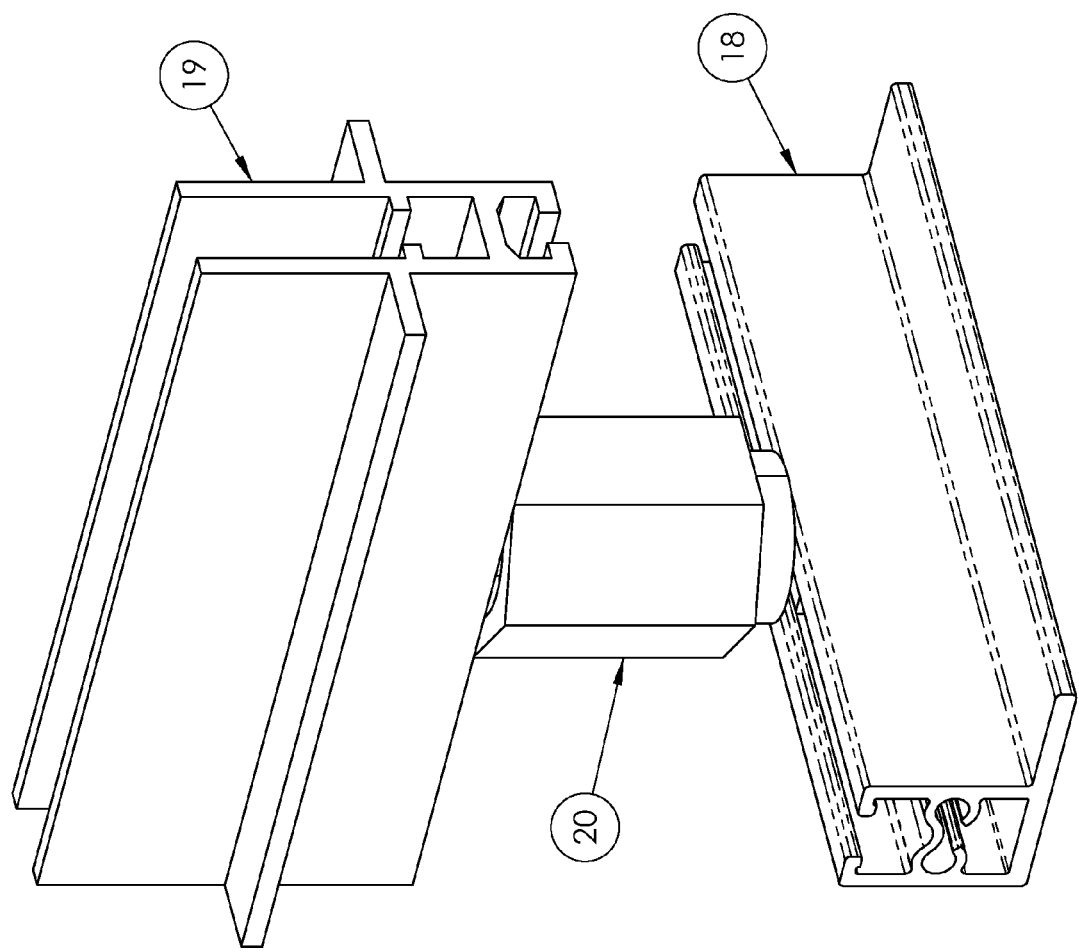
FIG. 3 is a view in perspective illustrating a grid connector in accordance with the present invention mounted between grid crossing members.

FIG. 3 shows a closer view of the grid connector 20 as it appears in its installed and locked condition. The mounting channel 18 and mounting rail assembly 19, shown in simplified form (and with only a short section of each), are situated in a substantially perpendicular relationship with one another as shown. With slight variations to the preferred embodiment of the invention, the mounting channel 18 and mounting rail assembly 19 can be located in any degree of rotational relation about the axis of the grid connector to accommodate PV panels of various shapes. This will become apparent from the more complete description of the invention below.

Figure 4:
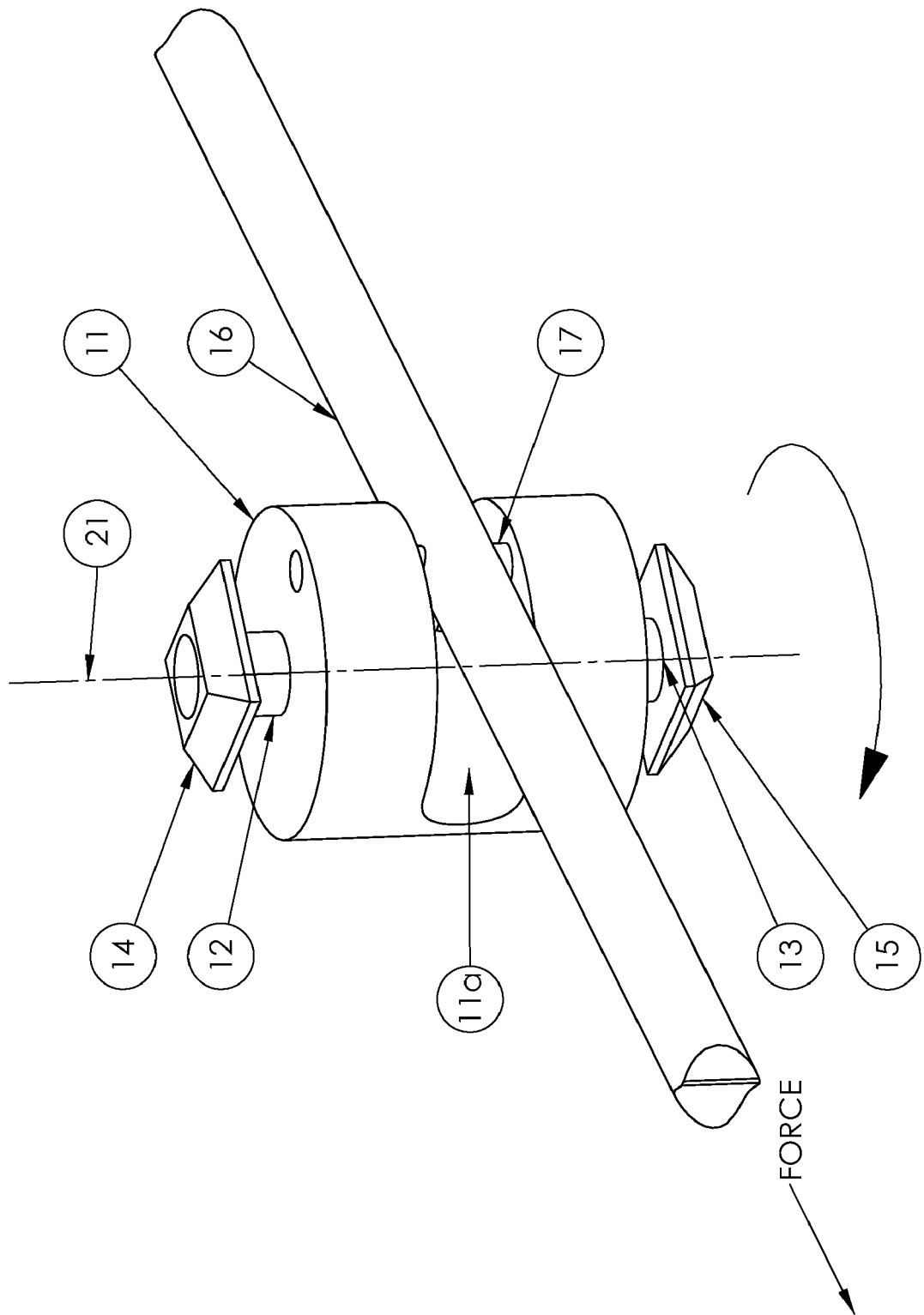
FIG. 4 is a view in perspective illustrating one embodiment of a grid connector utilizing threaded connections to facilitate a cam tightening actuation.

FIG. 4 shows an embodiment of the inventive grid connector 20 in more detail. In this embodiment, the grid connector 20 has a rotating body 11 with a slotted notch 11a within the rotating body 11. The right-hand threaded stud 12 and the left-hand threaded stud 13 are rigidly mounted to the rotating body 11, preferably by welding, friction fit (press fit) or by machining the body 11 and studs 12 and 13 from a single piece of material, such as aluminum or stainless steel. The studs 12 and 13 preferably have oppositely-directed threads (not shown), as indicated by the names of the studs 12 and 13, formed in the sidewalls thereof. The threads permit the corresponding right hand threaded clamp base 14 and left hand threaded clamp base 15 to be mounted to the studs 12 and 13, respectively, by inserting the studs 12 and 13 into collinear, cooperatively threaded bores formed in the ends of the clamp bases 14 and 15 and rotating the clamp bases 14 and 15 in the manner of a nut on a bolt shaft. The clamp bases 14 and 15 thus have the ability to rotate in a tightening or loosening direction as the rotating body 11, and thus the attached studs 12 and 13, are rotated about the rotational axis 21 relative to the clamp bases 14 and 15.

During installation, the clamp bases 14 and 15 are mounted to the studs 12 and 13, as shown in FIG. 4, and are inserted into corresponding slots or grooves in the roof mounting channel 18 and the mounting rail assembly 19 as described in relation to FIG. 2 above. The slots are preferably slightly wider than the sides of the clamp bases 14 and 15, and thereby prevent rotation of the clamp bases 14 and 15 in the slots. The slots also have inwardly facing lips (described above) that prevent withdrawal of the clamp bases 14 and 15 other than through the ends of the slots or grooves. During initial insertion, the clamp bases 14 and 15 are spaced far enough from the facing surfaces of the rotating body 11 that there is a gap in which the inwardly facing lips slide. Thus, no substantial resistance to movement of the connector 20 is encountered during insertion into the channel 18 and assembly 19. The channel 18 and assembly 19 are inserted in these gaps between the body 11 and the clamp bases 14 and 15, which gaps are slightly larger than necessary to permit movement of the clamp bases 14 and 15.

Once in position on the channel 18 and the assembly 19, the connectors 20 are clamped to the channel 18 and assembly 19 by rotation of the body 11. The clamping action can be accomplished in a first method by separately rotating the body 11 of each connector 20 about the rotational axis 21 using a tool, such as a wrench. During rotation, the axis 21 remains essentially immobile while the clamp bases 14 and 15 are maintained in the channel 18 and the perpendicular assembly 19. During rotation of the body 11 in one direction, the bases 14 and 15 are displaced toward the body 11 along the studs 12 and 13 by the interaction of the oppositely-directed threads of the studs 12 and 13 and the bases 14 and 15. During rotation in the opposite direction, the clamp bases 14 and 15 are displaced away from the body 11. When the bases 14 and 15 are displaced sufficiently toward the body 11, the gaps formed between the bases 14 and 15 and the body 11 become small enough that the inwardly facing lips of the channel 18 and assembly 19 are tightly clamped in the gaps. In the first method, each connector 20 has its body 11 rotated sufficiently to reduce the gaps to form a tight engagement.

The second method of tightening is accomplished similarly by rotating the body 11, but instead of each body 11 being rotated separately, a linkage 16, such as a rod, connects multiple grid connectors 20 in series so that they can be rotated simultaneously by movement of the linkage 16. The linkage 16 is mounted in the notch 11a of the rotating body 11 and pivotably mounts to a connecting pin 17 that is rigidly mounted into the sidewalls on opposite sides of the notch 11a. The grid connector 20 is thus driven during the second method into the tightened condition (described above in association with the first method) by applying a longitudinal force to at least one end of the linkage 16. This force displaces the linkage 16 longitudinally, and thereby causes the body 11, and the connected threaded studs 12 and 13, to rotate within the clamp bases 14 and 15 around the rotational axis 21 as with the first method. This rotation causes the grid connector 20 to tighten due to the oppositely-directed threads at opposite ends of the body 11, effectively drawing the clamp bases 14 and 15 toward the rotating body 11 simultaneously into a clamping configuration.

FIG. 5a shows an alternative embodiment of the grid connector assembly 20. In this embodiment, the grid connector 20 is made up of a cam barrel 22 with cam slots 22a and 22b that face in opposite directions from the outer surface of the barrel 22, and have slot-defining sidewalls that are angled oppositely to one another, in the manner of oppositely-directed threads. Thus, the slot 22a has an angle from the axis 21 of a left-hand thread, and the slot 22b has an angle from the axis 21 of a right-hand thread. The cam slots 22a and 22b are thus angled slightly from perpendicular to the axis 21, but are transverse to one another. The cam slots 22a and 22b can be located on the same side of the rotating barrel 22, as will be understood from the description herein, but for practical reasons preferably oppose one another.

Figure 5B:
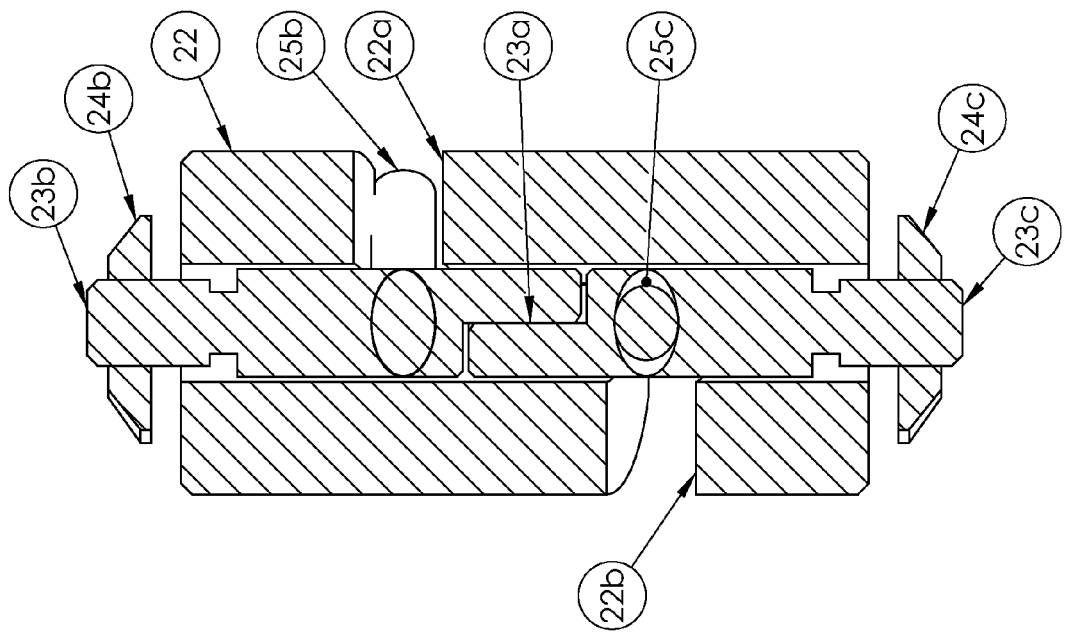

The clamping mechanism of FIG. 5a, which is shown in more detail in FIG. 5b as located in the center of the rotating barrel 22, includes dual draw pins 23b and 23c that are slidably and rotatably mounted in the circular cylindrical bore of the barrel 22, which bore and pins are coaxial with the axis 21. The draw bases 24b and 24c are rigidly mounted to the ends of the draw pins 23b and 23c, respectively.

Each of the draw pins 23b and 23c has a circular cylindrical, radially outwardly facing surface and, at the end closest to the other pin, a flat surface that is preferably aligned along the axis 21 (both flat surfaces are shown abutting one another at the interface 23a in the section view of FIG. 5b). The flat surfaces prevent rotation of one pin relative to the other pin. Each flat surface is preferably formed by removing substantially one half of the diameter of the pin along a fraction of the length of that pin. Thus, the flat surface of one pin abuts the flat surface of the other pin to prevent rotation of the pins relative to one another, while still permitting sliding movement of one pin relative to the other by sliding movement of the flat surfaces as the pins move along the axis 21. Of course, a larger portion of the diameter of one pin portion and a correspondingly smaller portion of the diameter of the other pin portion could be removed while accomplishing the same purpose.

As best shown in FIG. 5a, a cam lever 25b extends from the draw pin 23b into the cam slot 22a, and an identical cam lever 25c extends from the draw pin 23c into the cam slot 22b. The cam levers 25b and 25c preferably extend substantially perpendicularly from the draw pins into the cam slots 22a and 22b, and have a diameter slightly less than the width of the cam slots 22a and 22b so the cam levers 25b and 25c can slide freely in the cam slots. Rotation of the draw pins relative to the barrel 22 causes the cam levers to follow the sidewalls defining the cam slots 22a and 22b, thereby moving the draw pins 23b and 23c longitudinally relative to the barrel 22.

When the connector 20 of FIGS. 5a and 5b is installed within the mounting slots of the mounting channel 18 and mounting rail assembly 19, as described above in relation to the description of FIGS. 2 and 3, the barrel 22 can be rotated, such as with a wrench or with the rotation lever 26. During rotation of the barrel 22 about the axis 21, the draw pins 23b and 23c, and their attached draw bases 24b and 24c, remain fixed in position relative to the channel 18 and assembly 19 due to the rectangular faces of the draw bases 24b and 24c abutting against the inner surfaces of the channel 18 and assembly 19 (as with the draw bases 14 and 15 of the embodiment of FIG. 4). The barrel 22, along with its cam slots 22a and 22b, rotates relative to the draw pins and their extending cam levers 25b and 25c. The cam levers 25b and 25c follow the cam slots 22a and 22b during rotation of the barrel 22, thereby displacing the draw pins 23b and 23c longitudinally along the bore of the barrel 22 due to the oppositely directed angles of the sidewalls defining the cam slots 22a and 22b and the force each of the sidewalls applies to the cam levers during rotation. The connector 20 is shown in FIG. 5b with the draw pins 23b and 23c at almost their extreme longitudinally inward location, in which the inwardly facing lips of the channel 18 and assembly 19 (not shown in FIG. 5b) are clamped between the draw bases 24b and 24c and the ends of the barrel 22. By rotating the barrel 22 from the position shown in FIG. 5b, the draw pins 23b and 23c are driven away from one another to increase the gaps and thereby release the channel 18 and assembly 19.

The rotation lever 26 extends from the cam barrel 22 to enable a person to turn the cam barrel 22 about its rotational axis 21 without a separate wrench as would otherwise be needed to apply sufficient torque thereto. The rotation lever 26 may also be used to connect adjacent grid connectors 20 in series for single point tightening as described above in relation to the FIG. 4 embodiment. The grid connector 20 of FIGS. 5a and 5b can also be used without the rotating lever 26 and can be turned into a tightened condition with common tools such as a wrench or pliers.

Figure 6:
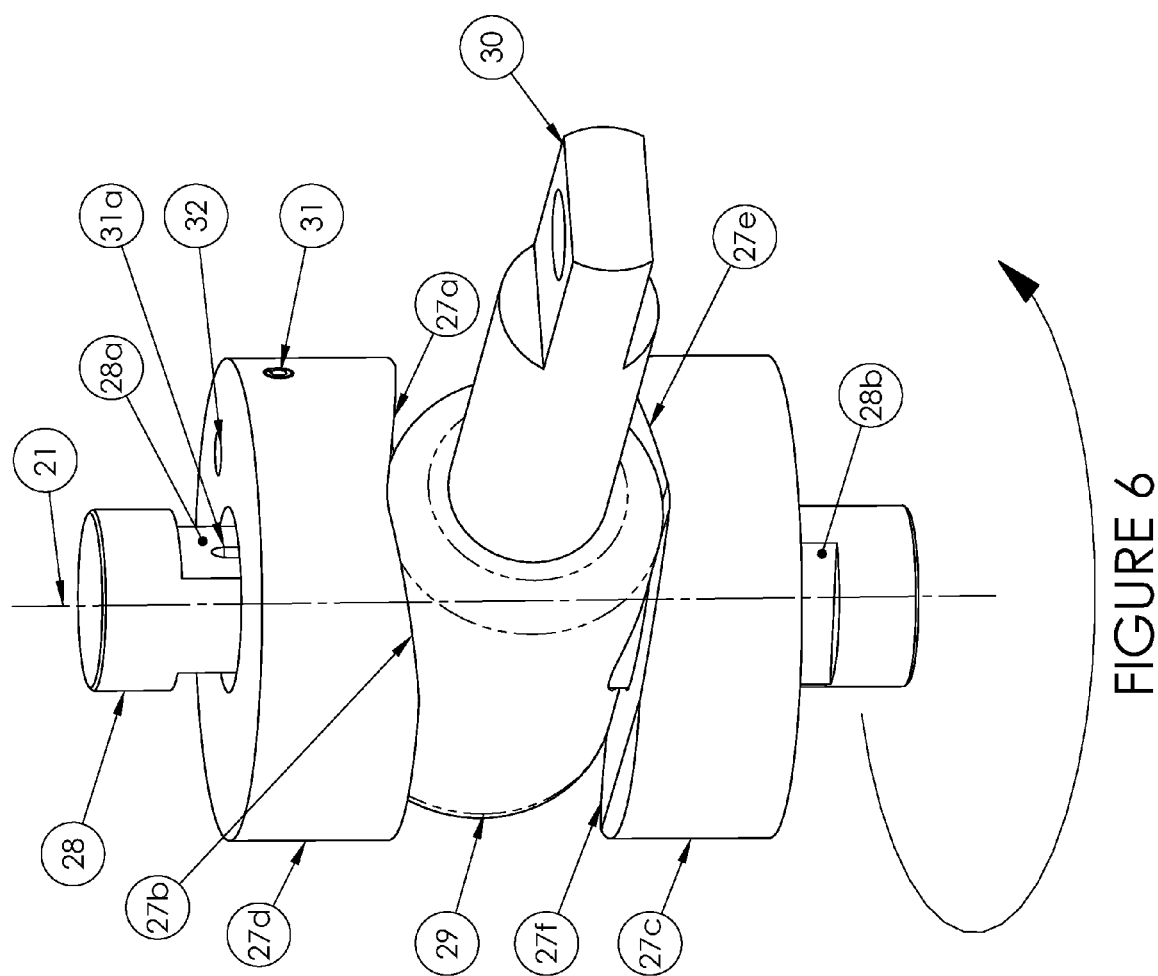
FIG. 6 is a view in perspective illustrating another embodiment of a grid connector having a multiple part cam actuator with dual cams that are forced outward using a rotating barrel.

FIG. 6 shows another alternative embodiment of the grid connector 20. Dual cam bodies 27c and 27d having an annular configuration with a central orifice. The opposite ends of a clamp pin 28 are inserted into the central orifices of the cam bodies 27c and 27d, and the axis 21 of the pin 28 is coaxial with the axes of the central orifices of the cam bodies 27c and 27d.

The connector pin 31 extends through the cam body 27d and into a longitudinal slot 31a formed in the clamp pin 28. An identical connector pin (not shown) extends through the cam body 27c and into an identical longitudinal slot in the opposite end of the clamp pin 28. The relationships between the central apertures of the cam bodies 27c and 27d, the clamp pin 28 and the connector pins 31 (and its identical twin, not shown) prevents rotational and/or radial movement of the cam bodies 27c and 27d relative to the clamp pin 28. This relationship also limits relative axial movement of the cam bodies 27c and 27d relative to the clamp pin 28, while permitting sufficient axial movement to clamp and unclamp the channel 18 and assembly 19 into which the ends of the pin 28 are inserted. The clamp pin 28 has perpendicular faces 28a and 28b to form a head that is wider at the ends of the pin 28 than at the perpendicular faces 28a and 28b. The faces 28a and 28b are inserted into the slots of the mounting channel 18 and mounting rail assembly 19 between the inwardly facing lips as described above in relation the embodiments of FIGS. 2 and 3. The thickness of the pin at the faces 28a and 28b is slightly smaller than the distance between the inwardly facing lips. The heads on the ends of the pin 28 define a gap between the heads and the axially outwardly facing surfaces of the cam bodies 27c and 27d.

An actuating lever 30 is rigidly mounted to the barrel 29 that is interposed between the cam bodies 27c and 27d. The barrel 29 is slidably mounted against the downwardly facing, angled cam faces 27a and 27b, as well as the upwardly facing, angled cam faces 27e and 27f, as shown in FIG. 6. When turned about the rotational axis 21 relative to the pin 28 and the cam bodies 27c and 27d, the lever 30 drives the barrel from the deepest region of the angled faces 27a, 27b, 27e and 27f (in the position shown in FIG. 6) to a less deep region, thereby sliding, and exerting opposite longitudinal forces, against the cam faces 27a, 27b, 27e and 27f. These forces in turn displace the cam bodies 27c and 27d toward the opposite ends of the pin 28, and thereby decrease the gaps in which the inwardly facing lips of the channel 18 and assembly 19 are interposed. This provides the locking force for the grid connector 20 to clamp to both the channel 18 and the assembly 19.

The grid connector 20 of FIG. 6 is held in the locked position with a lock pin 32 that contacts, and prevents rotation of, the barrel 29, or another means of preventing rotation. The actuating lever 30 is provided for rotating the actuating barrel 29 individually, or to connect grid connectors 20 in series and rotate them simultaneously.

Figure 7:
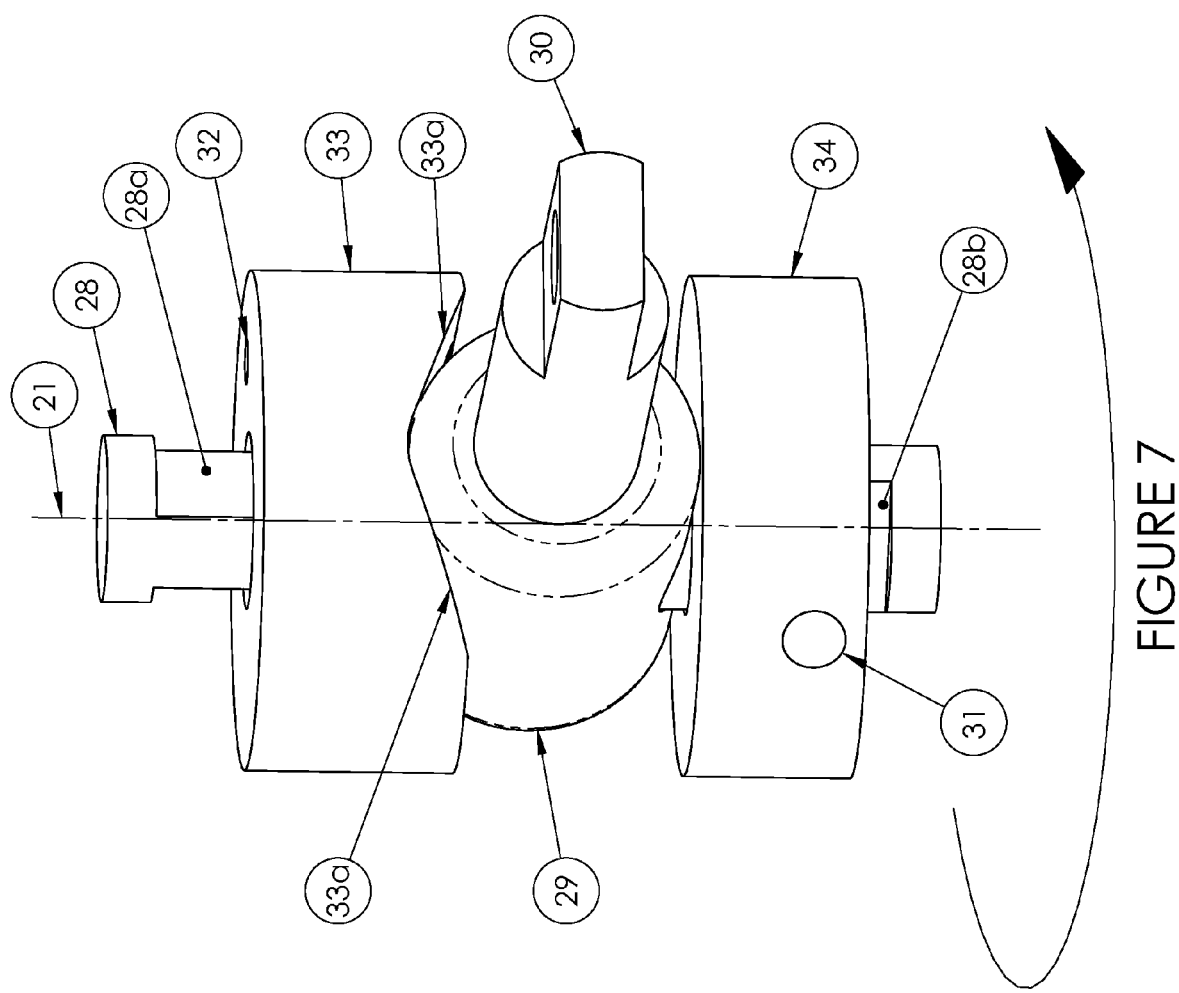
FIG. 7 is a view in perspective illustrating another embodiment of a grid connector having a multiple part cam actuator with a single cam that is forced outward using a rotating barrel.

FIG. 7 shows an alternative embodiment of the grid connector 20 that is very similar to the embodiment illustrated in FIG. 6. The FIG. 7 embodiment has a single cam body 33 used in conjunction with a flat disk 34 as the opposing face for the barrel 29, and the cam body 33 has steeper cam surfaces 33a than in the FIG. 6 embodiment. The steeper cam surfaces 33a provide for similar longitudinal movement of the cam body 33 and the flat disk 34, but accomplishes this with sloped surfaces on only one of the two moving structures.

Figure 8:
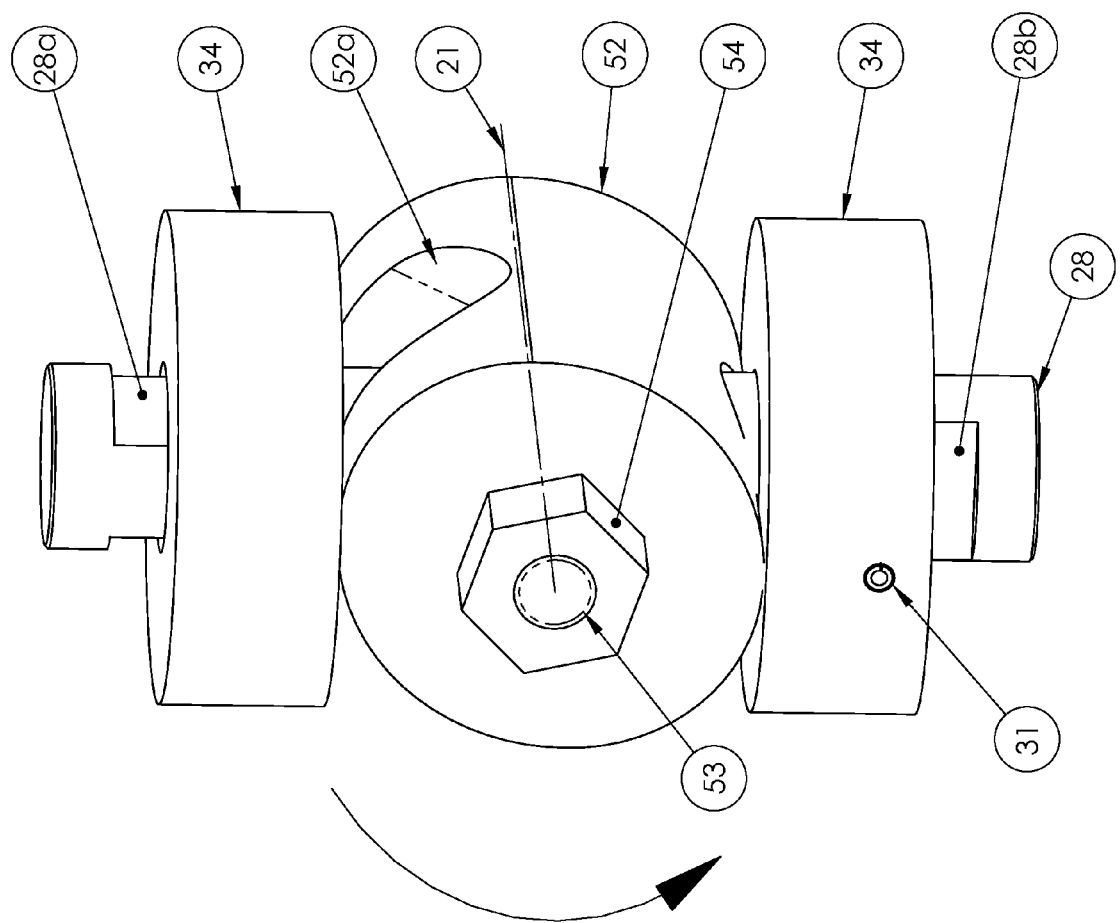
FIG. 8 is a view in perspective illustrating an alternative embodiment in which the tightening rotation is forced around the horizontal axis.

FIG. 8 shows another alternative embodiment that demonstrates the ability of the invention to be altered as to the manner by which the tightening cam is rotated to achieve a locking condition. In the FIG. 8 embodiment, the grid connector 20 has an oblong or oval-shaped cam barrel 52 with a slot 52a formed through its mid-section through which the clamp pin 28 is inserted. The cam barrel 52 is rotatably mounted to the clamp pin 28 by an axle 53 that extends longitudinally through the barrel 52 and transversely through the pin 28. The flat, annular disks 34 are positioned with the opposite ends of the clamp pin 28 inserted in the central orifices of the disks 34. The disks 34 are prohibited from moving radially or rotationally, and are limited to moving axially along a predetermined, limited path, relative to the pin 28 by the connector pins 31. As with the cam bodies 27c and 27d of the FIG. 6 embodiment, the flat disks 34 have enough axial movement to clamp and unclamp the channel 18 and assembly 19. The clamp pin 28 is provided with perpendicular faces 28a and 28b that engage the slots of the mounting channel 18 and mounting rail assembly 19, respectively, as in the embodiment described in relation to FIG. 6.

The tightening force applied to the connector 20 can be applied with a tool, such as a wrench or socket and ratchet, applied across the hexagonal flats 54 that turn the barrel 52 about the rotational axis 21. The flats 54 are formed on the end of the axle 53 and fixed to the cam barrel 52. Therefore, when the axle 53 is rotated, the cam barrel 52 rotates, thereby displacing the disks 34 either both toward or both away from the ends of the pin 28, thereby loosening or tightening, respectively. When the cam barrel 52 is in the tightened configuration, the oblong cam barrel 52 goes past its centerline. This locks the unit in position, because a rotational force is required to rotate the cam barrel 52 to the loosened configuration.

Figure 9:
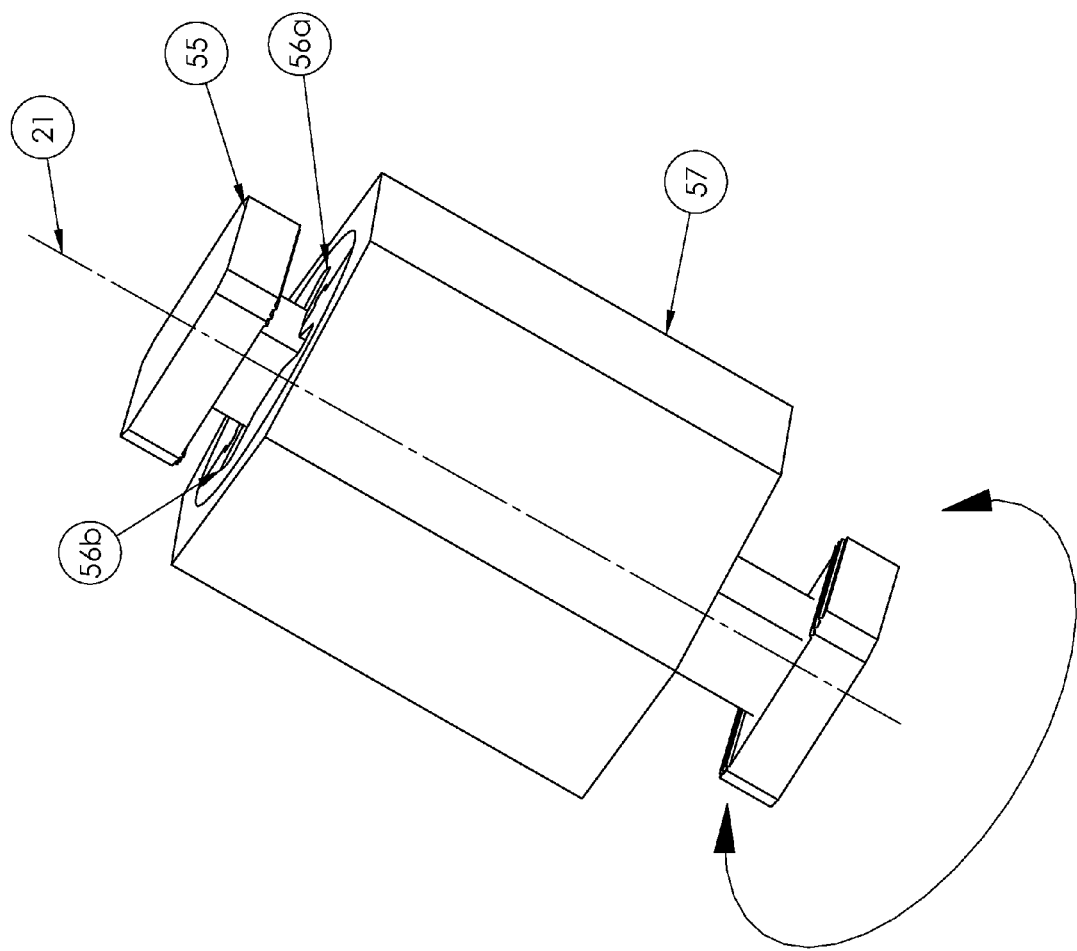
FIG. 9 is a view in perspective illustrating an alternative grid connector having a spiral cam action between the main support body and the outer body to create a clamping force with relation to a center pin.
Figure 10B:
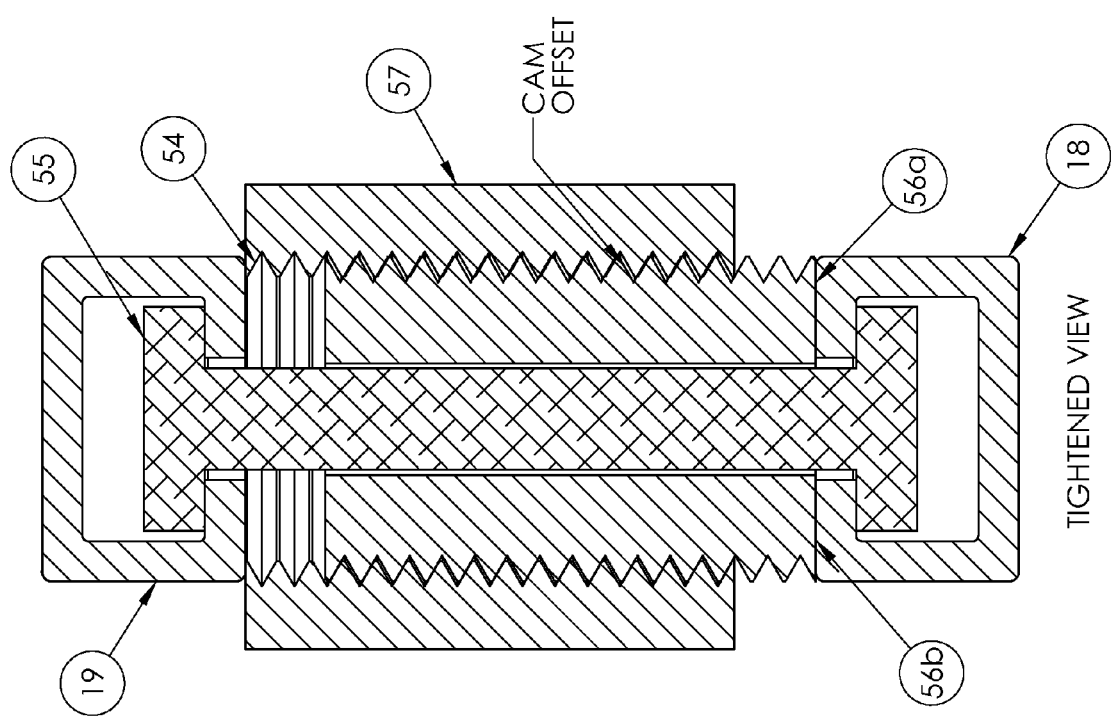
FIG. 10b is a side view in section illustrating the embodiment of FIG. 9 in a tightened configuration.

FIG. 9 shows another alternative embodiment of the cam locking grid connector 20 with a body 57 that rotates about a rotational axis 21 relative to the fixed inner bodies 56a and 56b (see FIGS. 10a and 10b). The inner bodies 56a and 56b are two separate halves of a body having a circular cylindrical, outwardly-facing, threaded surface that threadingly engages the circular cylindrical, inwardly-facing, threaded surface of the body 57. The pin 55 extends slidably through the central bore defined by the inner bodies 56a and 56b.

The inner bodies 56a and 56b are similar in configuration, but with slightly offset threaded surfaces relative to their ends, which has little effect when the halves are loose, as in FIG. 10a. However, the offset threaded surfaces become a locking feature when the associated halves are tightened in their working configuration, because the offset in the threads relative to their ends causes one of the inner bodies to seat against the lower portion of the threads of the body 57 and the other inner body to seat against the upper portion of the threads of the body 57 as shown in FIG. 10b. The locking action occurs when the cam (thread) surfaces are forced in opposing directions when the ends of the inner bodies 56a and 56b seat against the inwardly facing lips of the channel 18 (and similarly with the lips of the assembly 19), thereby creating an internal force within the grid connector 20 with one inner body pushing in one longitudinal direction and the other inner body pushing in the opposite longitudinal direction. The internal locking force limits the outer body 57 from being loosened from its tightened condition unless a significant rotational force is applied to the outer body 57. When used in conjunction with the mounting rails as described in relation to the embodiments of FIGS. 2 and 3, and using the cam (thread) surfaces formed between the two inner bodies to create the force to compress the channels 18 and assemblies 19 between the heads of the inner pin 55 and the ends of the inner bodies 56a and 56b, the locking force required to restrain the mounting grid in the desired working position is attained.

FIGS. 10a and 10b are provided to further illustrate the internal locking feature of the grid connector 20. There are preferably two inner body parts 56a and 56b, but there could be three, four, five, six or more inner body parts, that create an offset. While in the loosened condition, the inner body parts 56a and 56b offer little to no resistance to the rotation of the outer body 57 relative to the inner body parts 56a and 56b. However, once tightened against the inwardly facing lips of the mounting rails 18 and 19, the inner bodies 56a and 56b are forced into opposing directions by seating at their ends against a flat surface, thereby locking the cam surfaces of the inner bodies 56a and 56b into the inner cam surface 54 of the outer body 57.

The embodiments of FIGS. 4-10b illustrate various means for connecting the channels 18, which are mounted to a roof structure, to the assemblies 19, to which PV panels are mounted. The combination of the channels 19, connectors 20 and assemblies 19 form a foundation to which PV panels are mounted. According to the description and illustrations above, once the foundation is in place, the PV panels are mounted to the assemblies 19. FIGS. 11a through 15 illustrate advantageous structures for mounting PV panels to a foundation that is similar to that illustrated and described above, but which has some advantages over the assembly 19.

Figure 11A:
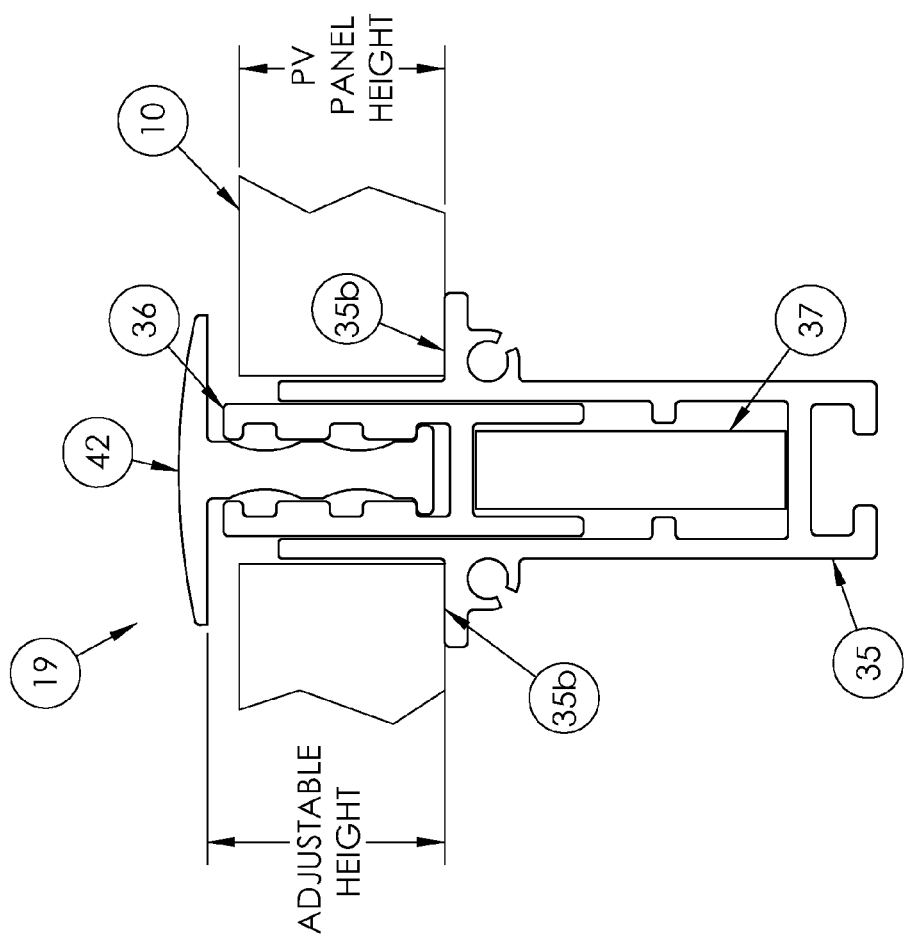
FIG. 11a is an end view illustrating a preferred mounting rail assembly in a first position due to a first panel thickness.
Figure 11B:
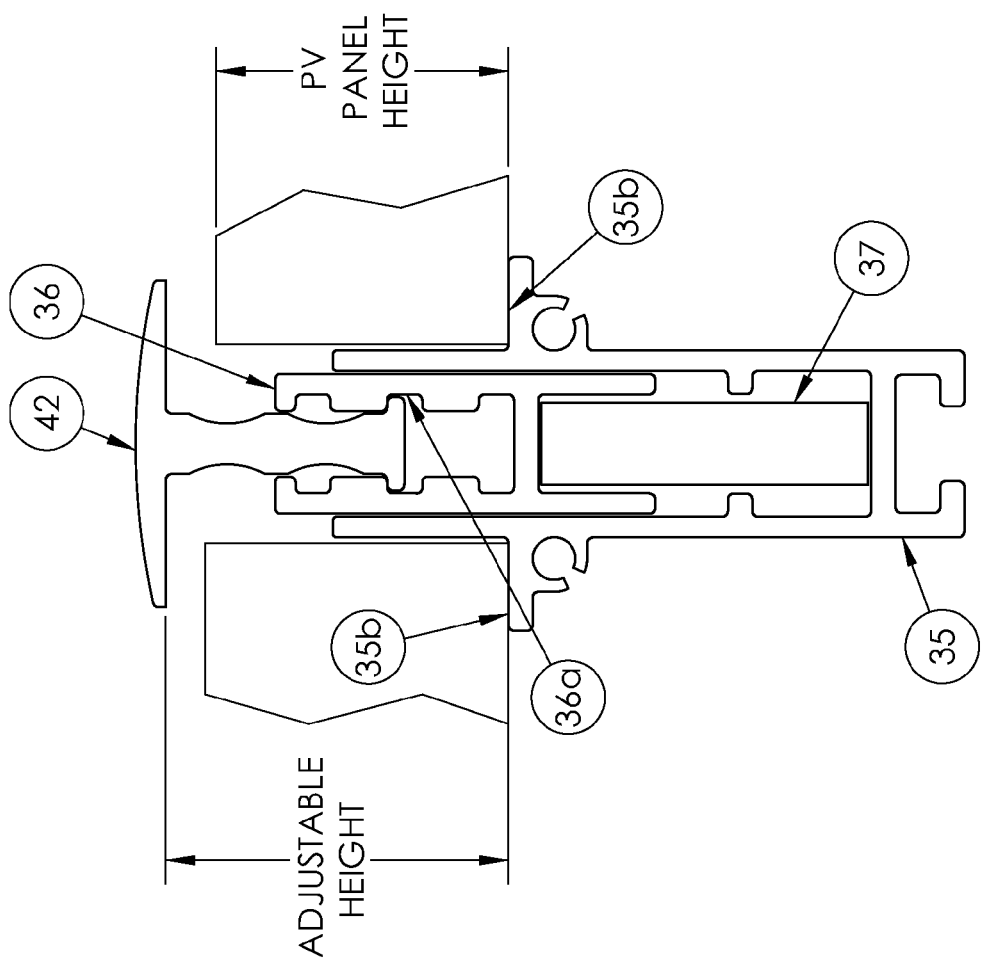
FIG. 11b is an end view illustrating a preferred mounting rail assembly in a second position due to second, thicker panel thickness.
Figure 11C:
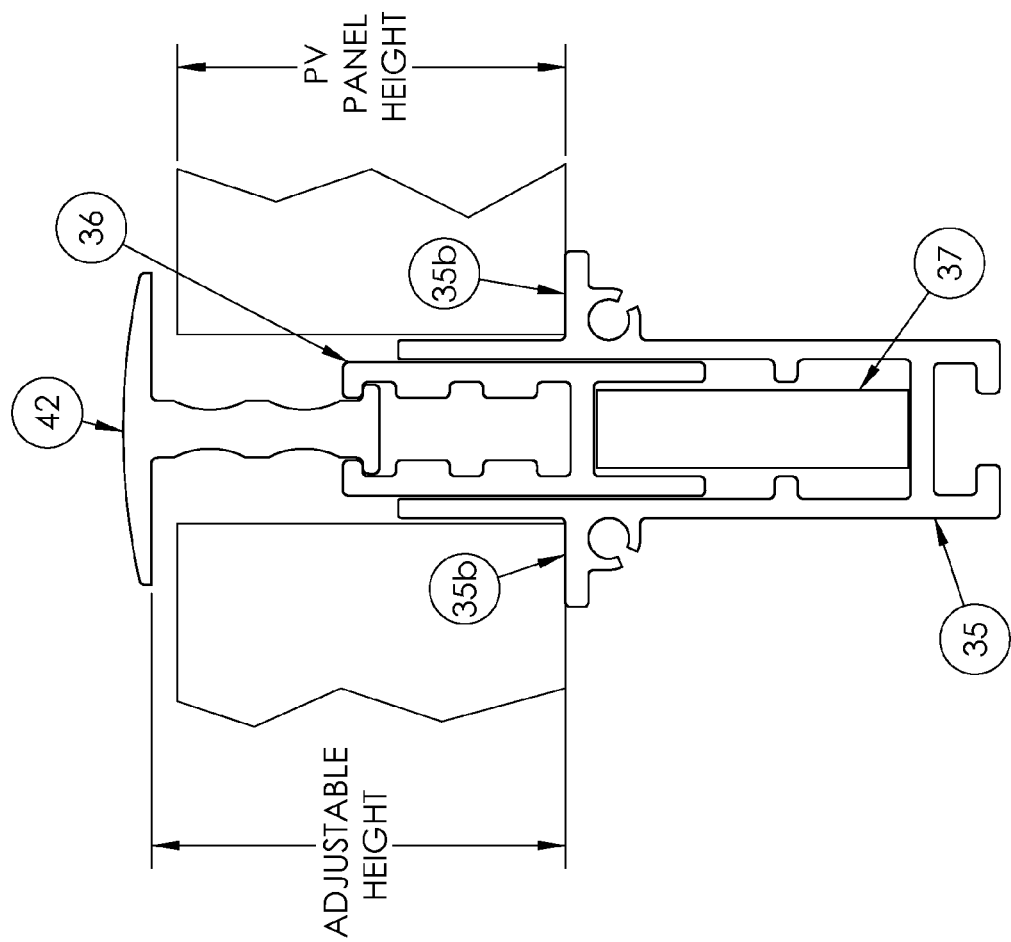
FIG. 11c is an end view illustrating a preferred mounting rail assembly in a third position due to a third, still thicker panel thickness.

FIGS. 11a, 11b and 11c show an end view of a horizontal mounting rail 35 that is preferably used in place of the conventional assembly 19, and illustrates the ability of the new rail 35 to clamp firmly onto different thicknesses of PV panels 10. The mounting rail 35 mounts to the connectors 20, and thereby the mounting rail 18 described above, to form a foundation for the PV panels. This attachment occurs using the groove at the bottom of the rail 35, in the orientation of FIG. 11a, into which is inserted an end of a grid connector 20, such as one of the grid connectors shown in FIGS. 4-10b, and tightened as described above in relation to the assembly 19.

One feature of the FIGS. 11a-11c design is a common horizontal mounting rail 35 that is usable among a wide range of PV panel 10 thicknesses. Prior art designs require different fasteners or assemblies for different thicknesses. The design shown in FIGS. 11a-11c, however, can be used with various thickness PV panels with the same parts as are shown, due to its features described below.

The horizontal mounting rail 35 has an adjustable clamping member 36 that inserts into a channel in the U-shaped base and is adjustably mounted to the base by pivot links as described below in association with FIGS. 12a-12d. The adjustable top cap 42 mounts into the clamping member 36 when laterally extending ribs on a lower edge are inserted into slots formed on opposite sides of a groove formed in the clamping member 36. The ribs are designed to retain the top cap 42 in the clamping member 36 to form a gap into which the edge of the PV panel is mounted as shown. The top cap 42 can be positioned and repositioned in one or more positions within the slotted adjustable clamping member 36, by simply removing the top cap 42 and inserting its ribs in the desired slots. Each position forms a different size gap between the downwardly facing surfaces of the top cap 42 (in the orientation of FIGS. 11a, b and c) and the upwardly facing surfaces of the mounting ledges 35b. It is typical that the PV panel is not the exact size of the gap between the mounting ledges 35b and the top cap 42. Any additional space is reduced by the mechanism described in relation to FIGS. 12a-12d below.

FIGS. 11a-11c show three pairs of opposing slots 36a in the slotted adjustable clamping member 36, but a person of ordinary skill will understand from this description that the member 36 can have one, two, four, five or even more such slots to vary the number of discrete gap sizes of the PV panel prior to adjustment. Additionally, although two laterally extending ribs are shown, it is contemplated to use only one such rib. Similarly, it is contemplated that a different structure can be used to mount the top cap to the clamping member 36, including hooks, pins that insert into holes and others in order to provide attachment at discrete points.

Figure 12A:
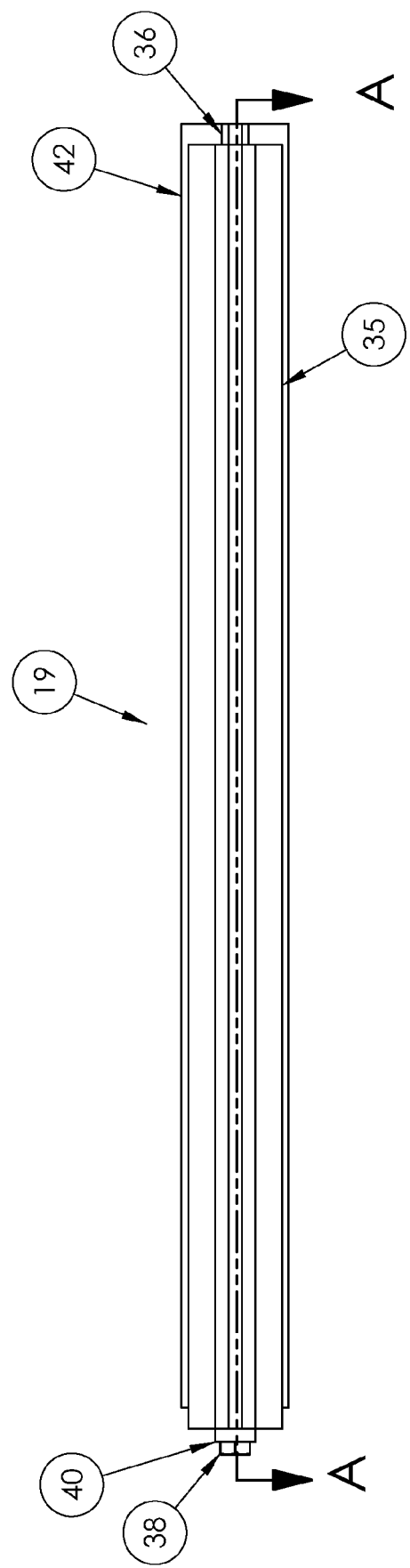
FIG. 12a is a bottom view illustrating a unique clamping cap.
Figure 12B:
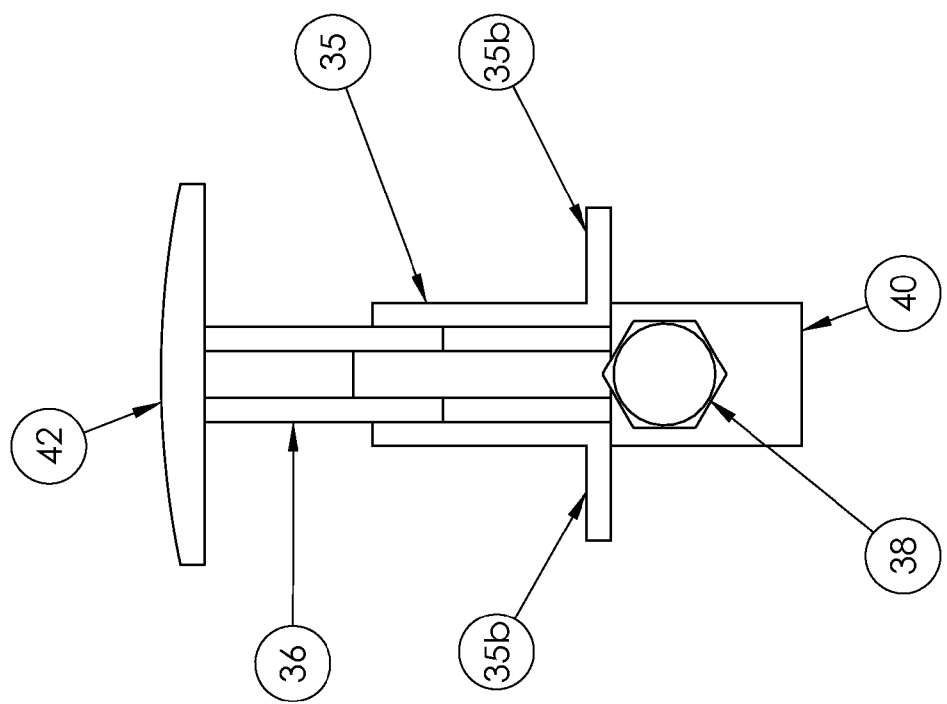
Figure 12B:
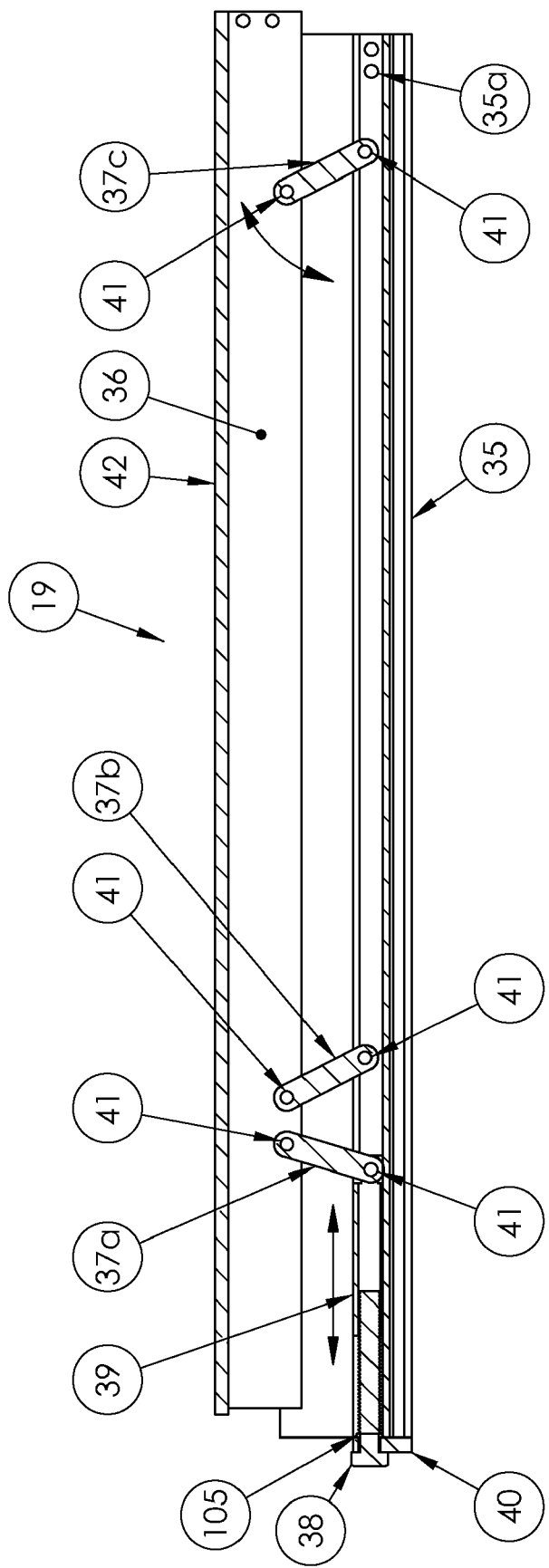
Figure 12C:
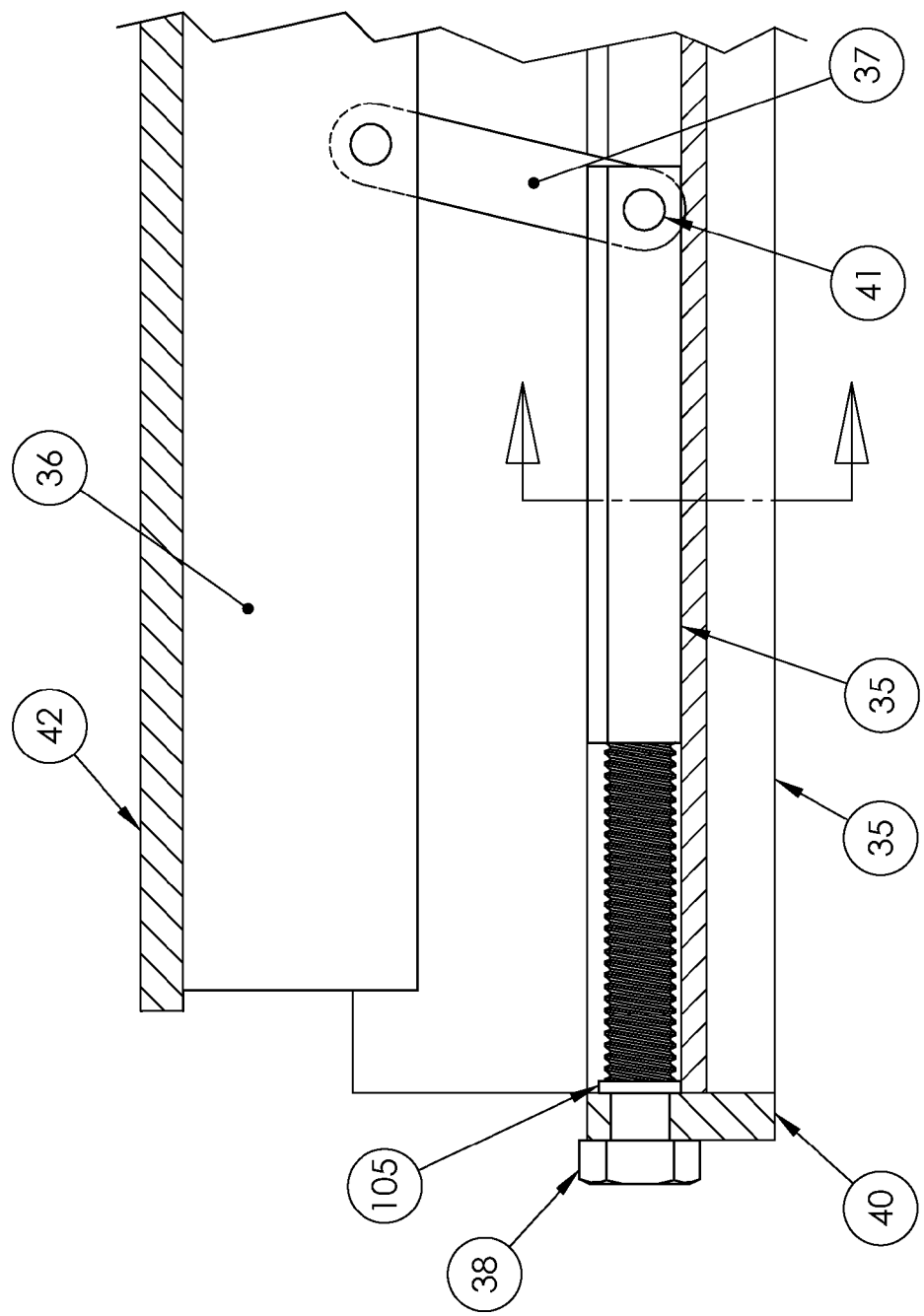
FIG. 12c is a side view in section illustrating a magnified view of the embodiment shown in FIG. 12b".
Figure 12D:
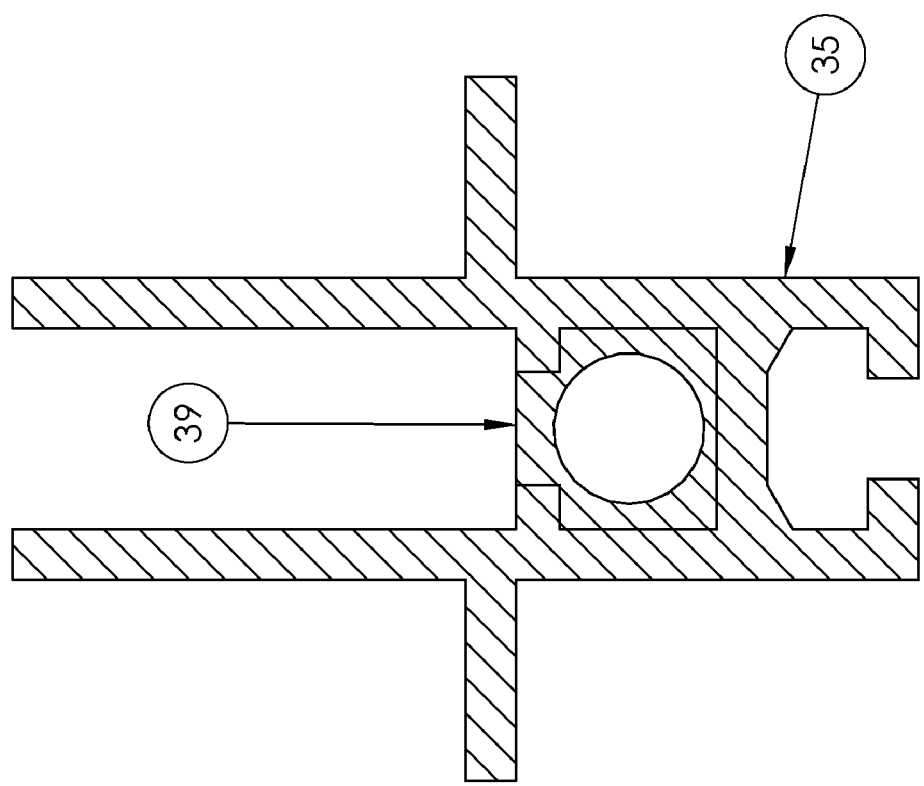
FIG. 12d is an end view in section of the embodiment shown in FIG. 12c.

FIG. 12a is a view from the bottom of the mounting rail assembly 35 with the section view of FIG. 12b" 'cut' along the longitudinal centerline A-A of FIG. 12a to reveal the inner workings of this portion of the invention. As noted in the description of FIGS. 11a-11c, the alternative mounting rail assembly 35 includes a mounting base into which an adjustable clamping member 36 is inserted and into which a top cap 42 is mounted. As noted, the assembly 35 includes multiple pivot links, which are given the reference numerals 37a, 37b and 37c in the drawings, that are pivotably mounted with linkage pins 41 to both the mounting base and the clamping member 36. The pivot link 37a is active, and the pivot links 37b and 37c are passive, and the latter two are preferably spaced substantially equally along the length of the mounting base 35, and are preferably parallel to one another. The pivot links 37a-37c draw the clamping member 36 toward the base to reduce any remaining gap formed between the cap 42 and the ledges 35b caused by the difference in thickness between the gap formed by the insertion of the top cap 42 in one of the discretely spaced slots 36a of the clamping member 36 and the thickness of the PV panel.

The pivot links 37 provide a parallel and uniform clamping force across the assembly's 35 entire length. The clamping force is applied with the following structure. A jack bolt 38 and jack block 39, along with a jack bolt retainer 40 and jack bolt stop collar 105, are disposed at one end of the assembly 35. The pivot link 37a is pivotably mounted with the link pins 41 to the clamping member 36 at the upper end, and the jack block 39 at the lower end. The jack block 39 is slidably mounted in a groove formed in the base, and is threaded to receive the jack bolt 38. The jack bolt 38 is rotatably mounted in the jack bolt retainer 40, and is restrained by the jack bolt stop collar 105. Rotation of the jack bolt 38 applies a linear force to the jack block 39, thereby displacing the jack block 39 in the slot. This displaces the connected lower left end of the pivot link 37a in the same direction along a line. Movement of the left end of the pivot link 37a displaces the clamping member 36 along an arcuate path as the member 36 rotates about the pivot links 37b and 37c at the same rate along its entire length. For example, tightening rotation of the jack bolt 38 forces the clamping member 36 to tighten toward the base over its given permitted range. Reverse rotation of the jack bolt 38 causes a reverse movement. During tightening, a linear force is applied to the active pivot link 37a, which is directed parallel to the length of the base. This draws the clamping member 36, and its attached top cap 42, toward the base and the integral ledges 35b on which the PV panel rests.

With a PV panel 10 resting on the ledges 35b formed in the base (as shown in FIGS. 11a-11c), the clamping action of the clamping member 36 causes the attached top cap 42 to seat against the PV panel 10 in order to retain the PV panel firmly in place in the now smaller gap between the top cap 42 and the ledges 35b. It is contemplated that the spaces between the slots 36a and the amount of take-up of the pivot links 37a-37c are designed with enough overlap in each that the assembly 35 provides a parallel and evenly-distributed force that clamps the PV module 10 to the mounting surface 35b for any thickness PV panel within a given range.

Figure 13A:
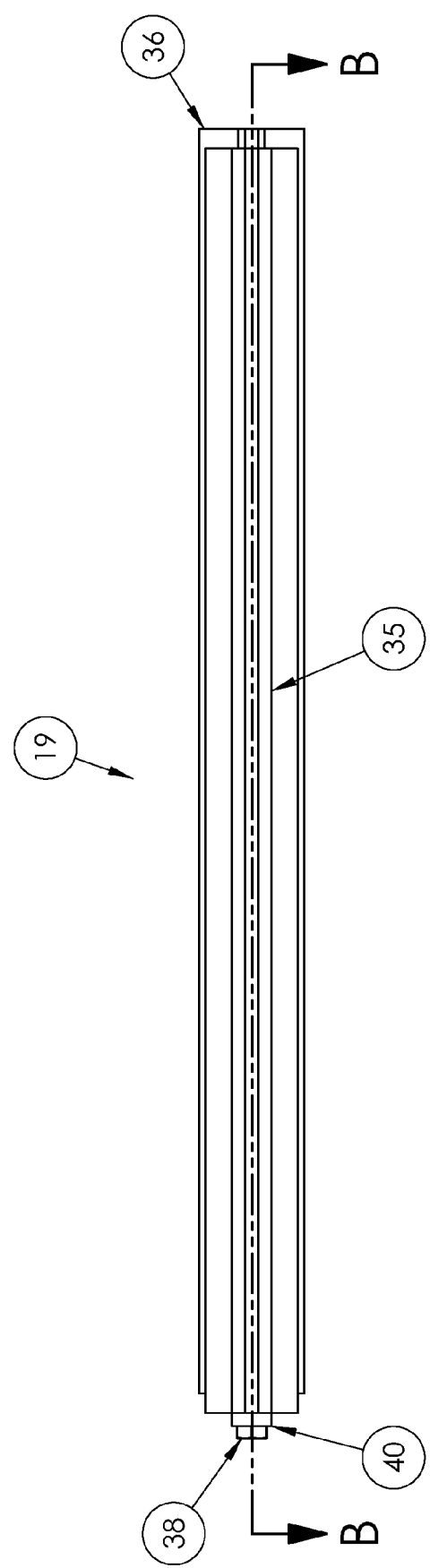
Figure 13B:
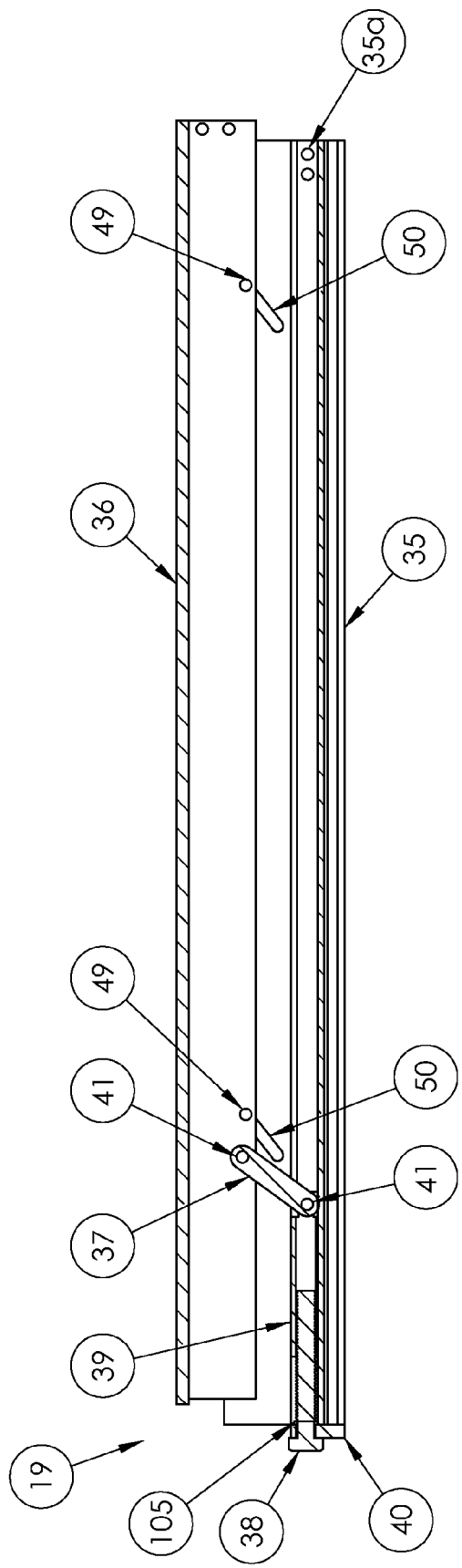
FIG. 13b is a side view in section illustrating the embodiment of FIG. 13a in which the unique clamping cap is controlled by use of cam slots and cam follower devices to control the parallel motion and clamping force.

FIGS. 13a and 13b show two views of another alternative embodiment of the mounting rail assembly 19. In this embodiment, a similar jack mechanism is used, but the cam slots 50 (formed in the base) and cam followers 49 (pins inserted through the clamping member 36 into the cam slots 50) are used instead of the pivot links 37 to provide a parallel force on the clamping member 36 against the installed PV panels 10. This example is provided to show alternate means of accomplishing the same results while still following the original concept of the invention as illustrated in FIGS. 12a through 12d.

Figure 14A:
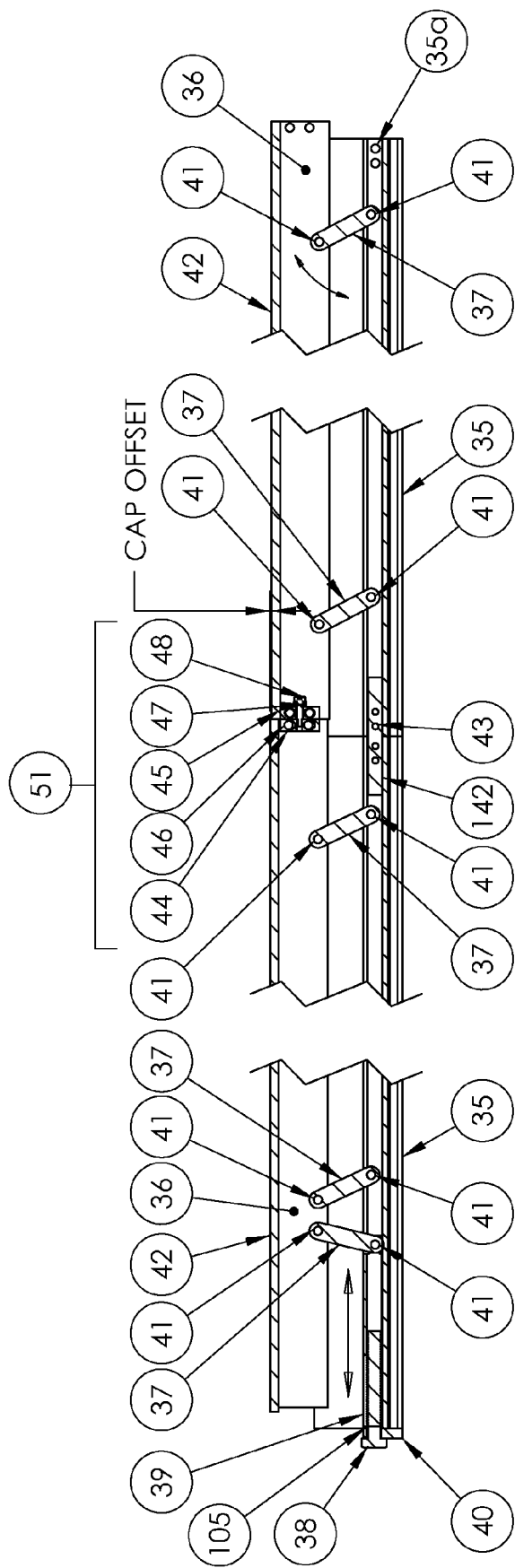
FIG. 14a is a side view in section illustrating a device for joining sections of clamp cap.
Figure 14B:
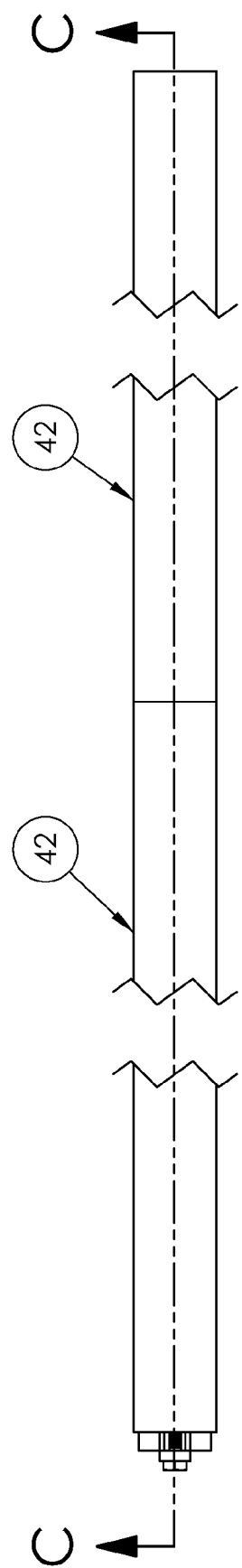
Figure 14C:
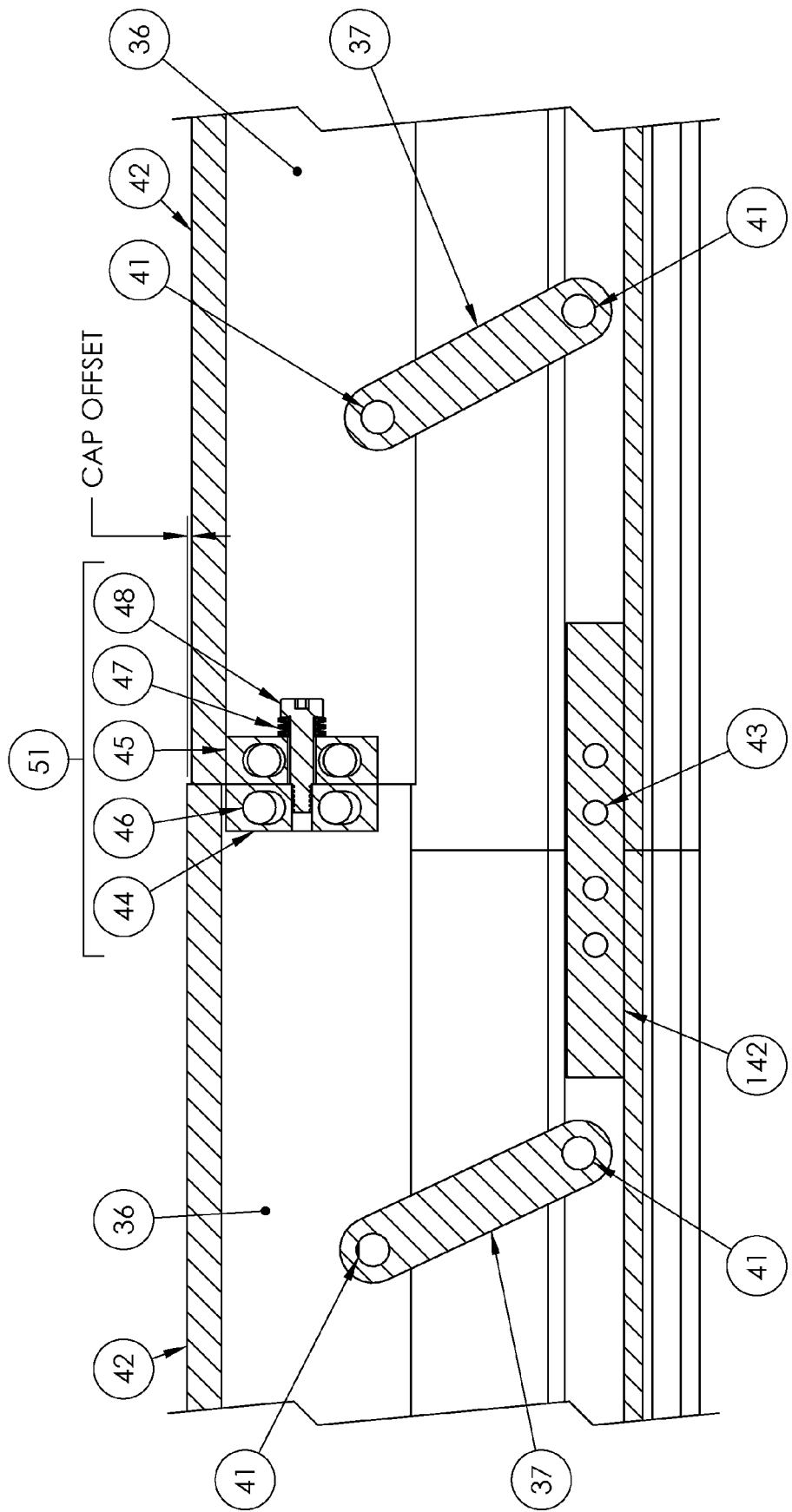

If a longer assembly 35 is desired, there are connection points 35a formed in at least one end of the assembly 35 to permit the extension of the mounting rail assembly's length to accommodate longer installations. FIGS. 14a, 14b and 14c illustrate the ability of this invention to be extended to accommodate longer installations by allowing additional mounting rail assemblies 35 to be joined to form a single functioning unit. The assemblies are attached in series by connector bars 142 and connection fasteners 43 at the base and a tensioning joint connector assembly 51 attached to the clamping member 36. One feature of this embodiment is the ability to operate multiple sections using a single jack bolt 38 to operate the entire length of the joined mounting rail assemblies 19.

Another feature of this embodiment is the tensioning connector 51 (see FIG. 14c) that includes two "floating" connectors 44 and 45 attached to the clamping member 36 using tension joint fasteners 46. Elongated slots in the connectors 44 and 45 permit vertical (in the configuration of FIG. 14c) movement. The tension joint assembly 51 includes a slide bolt 48 and tensioning component, which is preferably a spring 47. The adjoining assemblies 35 are machined to create a stepped arrangement, which is realized in a clamping member 36 offset that also extends to the top cap 42 that seats against the PV panel. This offset in the adjoining clamping members 36 allows the clamping member 36 that is farthest from the jack bolt 38 to tighten against the PV panels 10 within its length, thereby compressing the spring 47 to be tightened prior to the adjoining section while allowing the adjacent section to continue tightening to the PV panels 10 over its length. This stair step arrangement continues across the entire width of the PV panel 10 array until all the connected sections of mounting rail assemblies 35 are uniformly tightened.

Figure 14D:
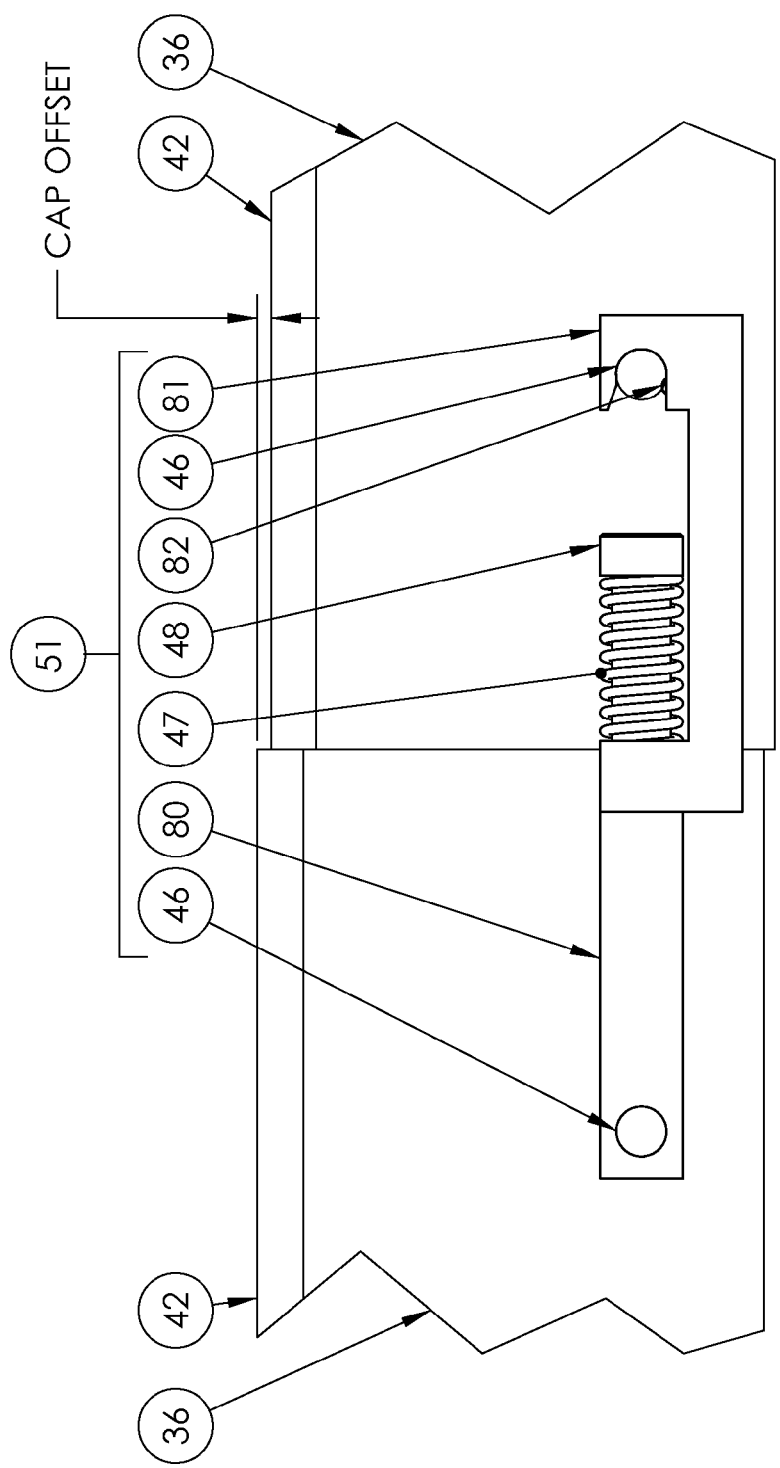
FIG. 14d is a magnified side view of the illustration of FIG. 14a showing an alternative tensioning joint connector assembly to that illustrated in FIG. 14c.

FIG. 14d shows an alternative to the tensioning connector 51 that has multiple members forming a pivotal linkage in place of the floating arrangement described in relation to FIG. 14c. The tensioning connector 51 of FIG. 14d is connected to the clamping member 36 using tension joint fasteners 46. The tension base block 80 is fixed to the clamping member 36 and the opposing tension attachment end 81 has a slot that surrounds, and is thereby attached to, the other tension joint fastener 46. The attachment end 81 pulls into position in the slot, and locks against the ball detent 82 or similar locking device to prevent unintentional removal. As in the illustration of FIG. 14c, the tension joint assembly 51 includes a slide bolt 48 and a tensioning component, which is preferably the spring 47. The slide bolt 48 extends through the spring 47 and through a hole formed in the left end (in the configuration shown in FIG. 14d) of the tension attachment end 81 and is affixed to the tension base block 80, preferably using a threaded connection. The described joint thus allows the tension base block 80 and the tension attachment end 81 to separate under tension load in a linear fashion, thereby applying even forces to the clamping member 36 and top cap 42 in relation to the PV modules 10 disposed along the length of the PV array.

Figure 15:
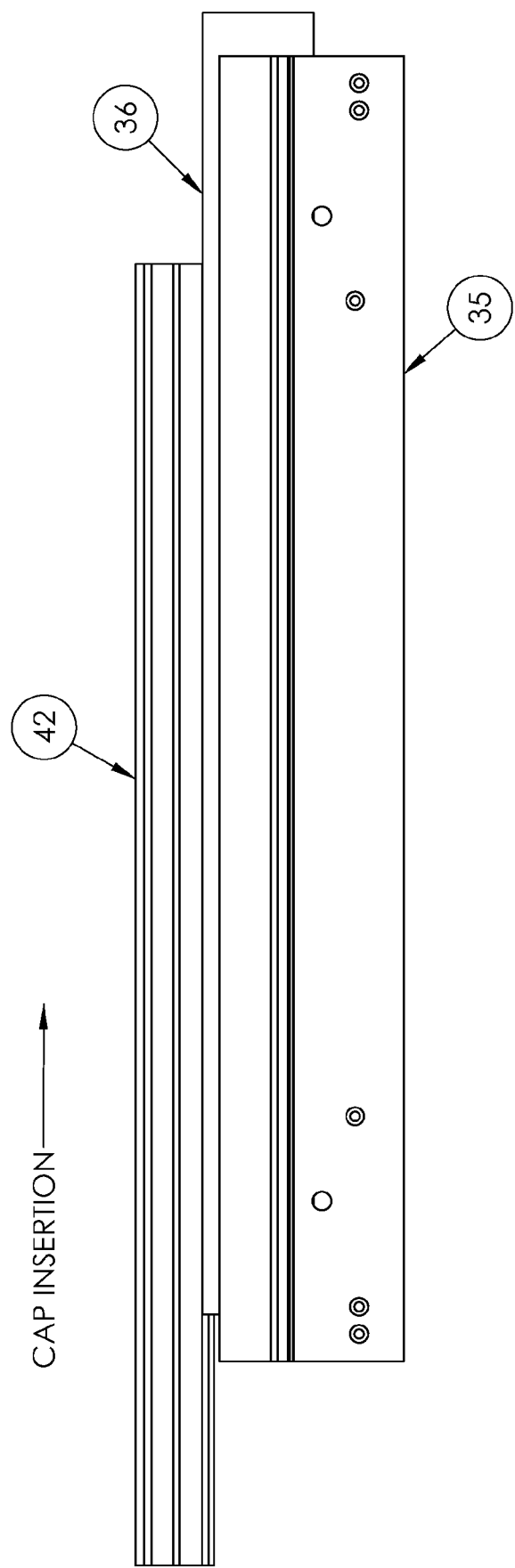
FIG. 15 is a side view illustrating a top cap rail of the embodiment of FIGS. 11a-11c being slidingly inserted into the mating cap retainer.

FIG. 15 shows a side view of the horizontal mounting rail assembly 35 with the adjustable top cap 42 being inserted into position inside the slotted adjustable clamping member 36. The cap 42 slides in from either end, but with slight modification could snap in place using downward force. For example, if the laterally extending ribs are formed of compressible material or spring-loaded cogs, one can insert the ribs into the slots 36a.

Figure 16A:
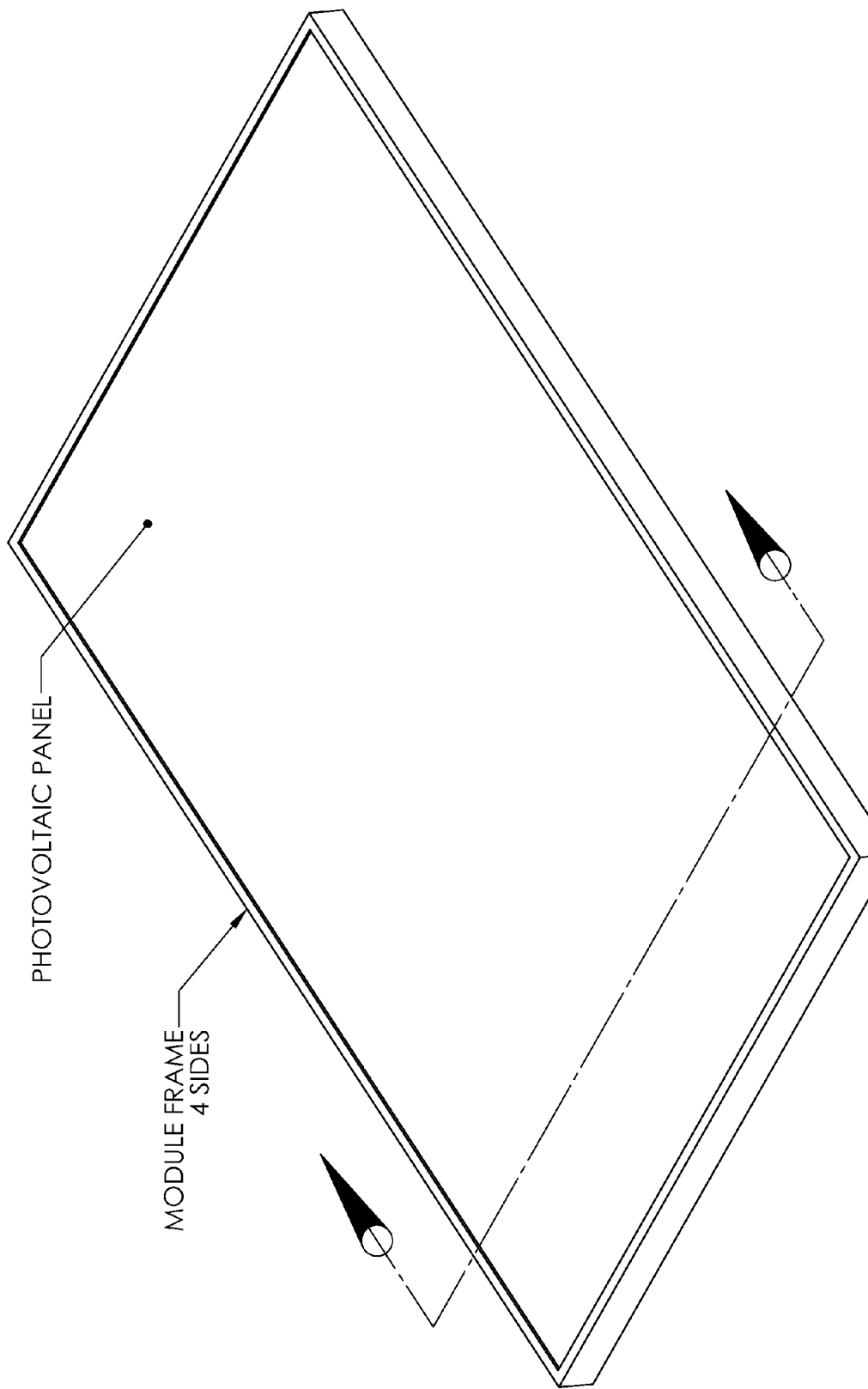
FIG. 16a is a view in perspective illustrating a prior art photovoltaic panel encased on all four sides with an aluminum extruded frame.
Figure 16B:
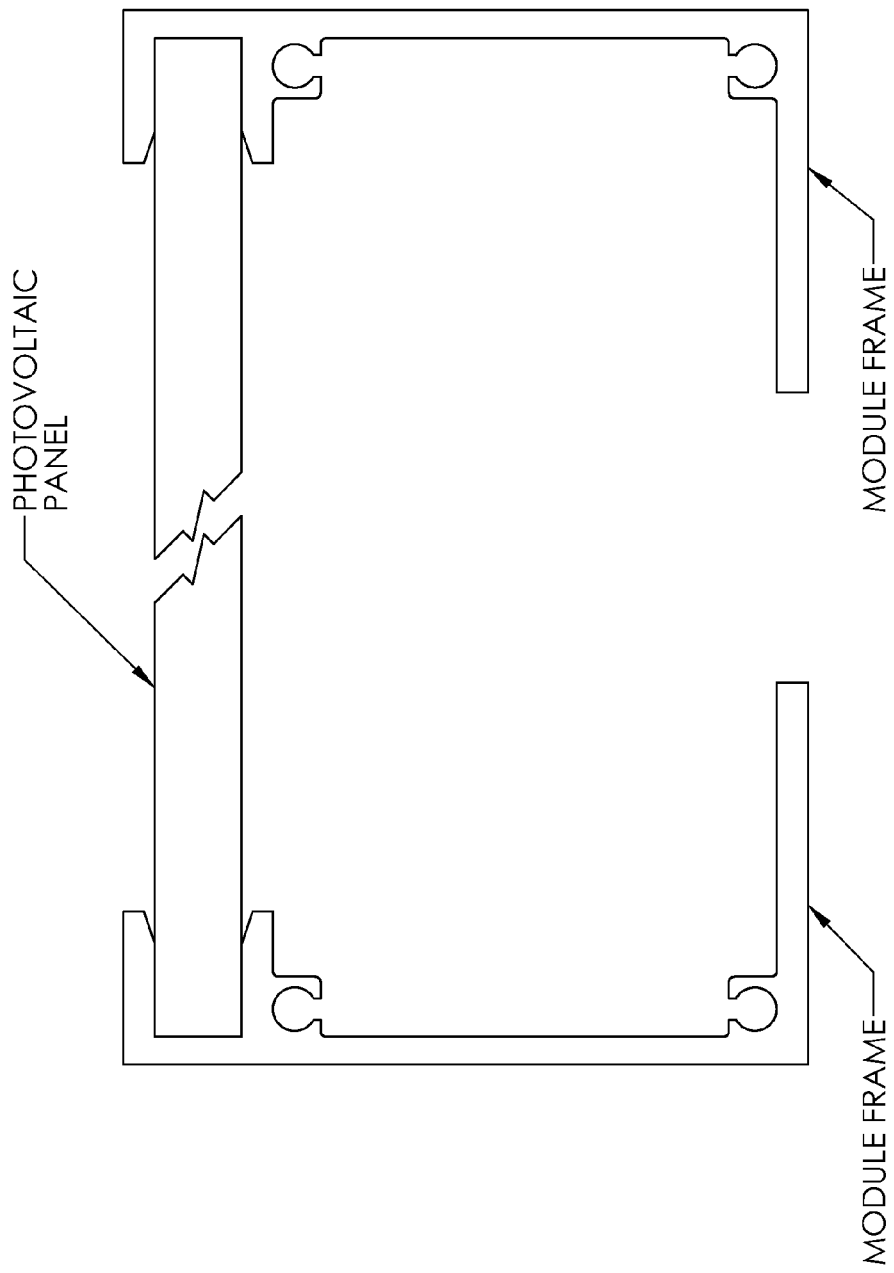

A conventional PV module made of a glass-covered PV panel encased on all four sides with an extruded aluminum frame is illustrated in FIGS. 16a and 16b. The extruded aluminum encasement is primarily provided to protect the PV panel mechanically and is used to mount the panel to a roof structure in its usable orientation. The exterior surfaces are generally smooth and provide no method of direct attachment other than clamping across the extrusion or bolting through the lower leg created by the extrusion. It is a common practice to secure the PV module in various ways, such as clamping, bolting and mechanical rail systems as described in relation to the description of FIG. 1.

Figure 17:
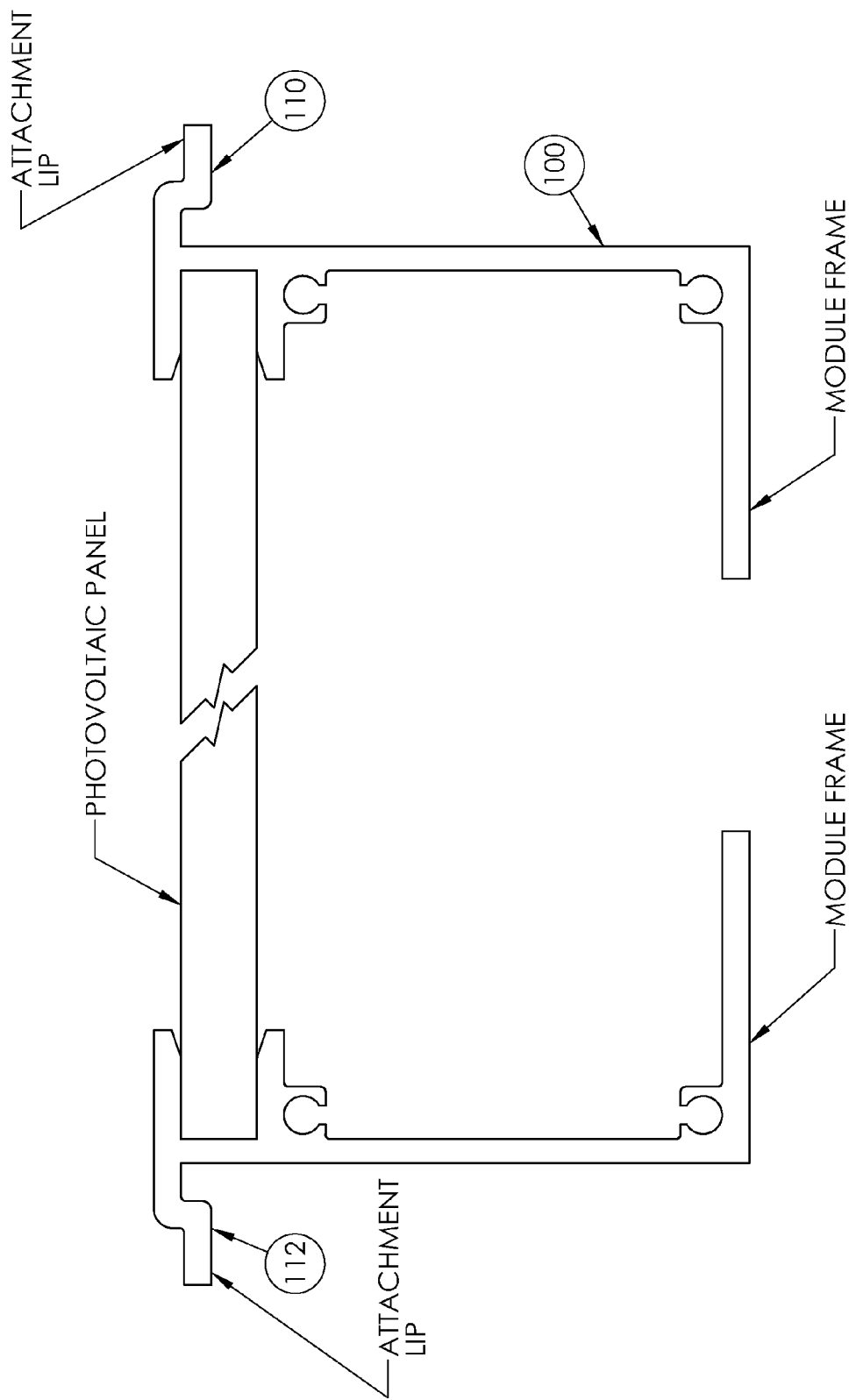
FIG. 17 is an end view in section illustrating a photovoltaic module with an improved exterior extrusion that includes an extruded attachment lip to assist in mounting.

FIG. 17 shows an improvement to the conventional extruded encasement for PV modules. The frame 100 is conventional in its configuration except for the attachment lips 110 and 112 added thereto, such as by forming openings in the extrusion mold to form the lips 110 and 112 integral with the frame 100. The attachment lips 110 and 112 are formed on all four sides of the PV module when encasement of the sort shown in FIG. 17 is used on all four sides. The attachment lip used in conjunction with an improved mounting rail described below forms a hinged-style mounting attachment that makes mounting to the foundation (mounted to the roof structure, for example) much quicker than conventional systems.

Figure 18A:
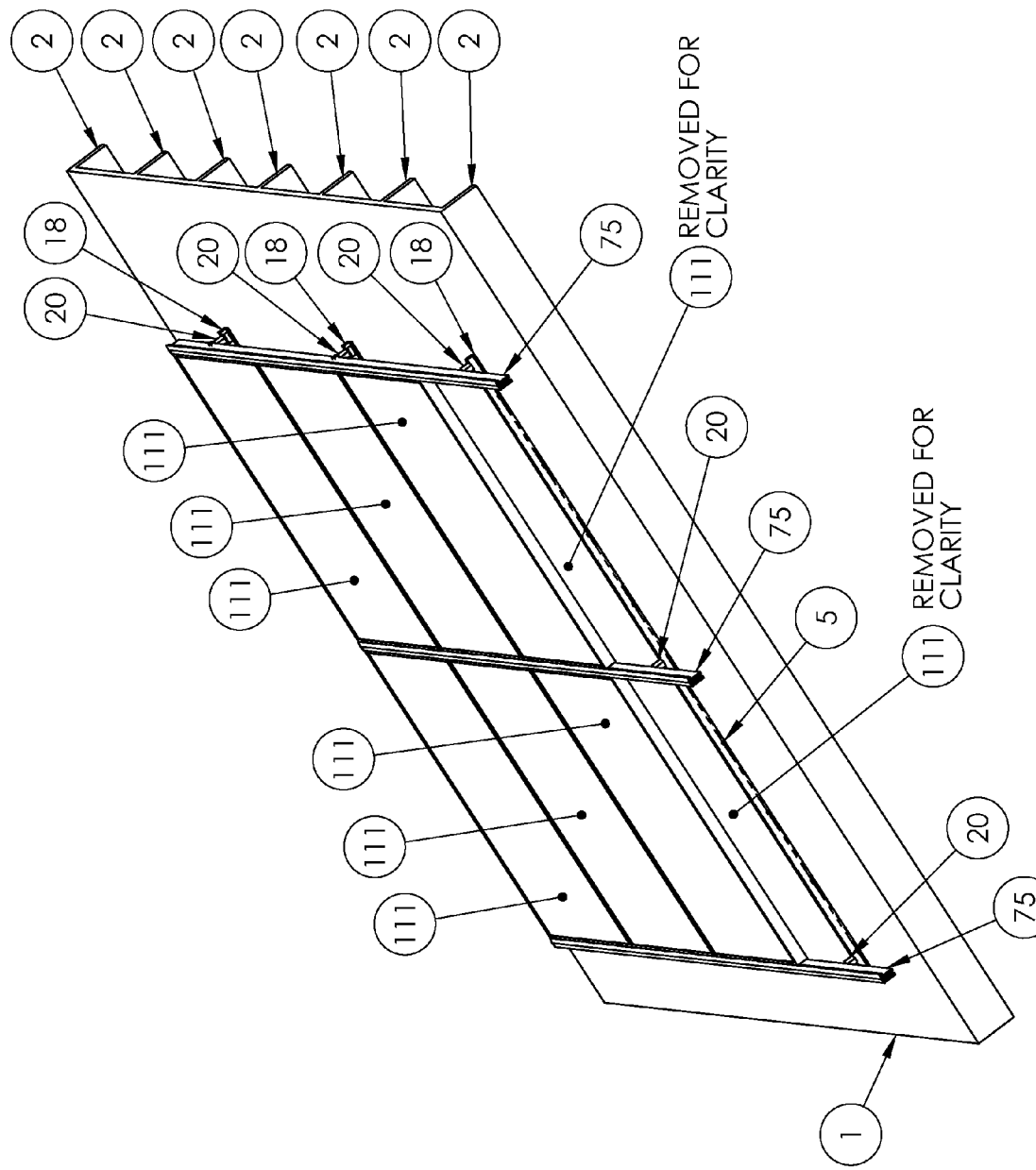
FIG. 18a is a view in perspective illustrating an alternative mounting of a PV module using an attachment lip as shown in FIG. 17.
Figure 18B:
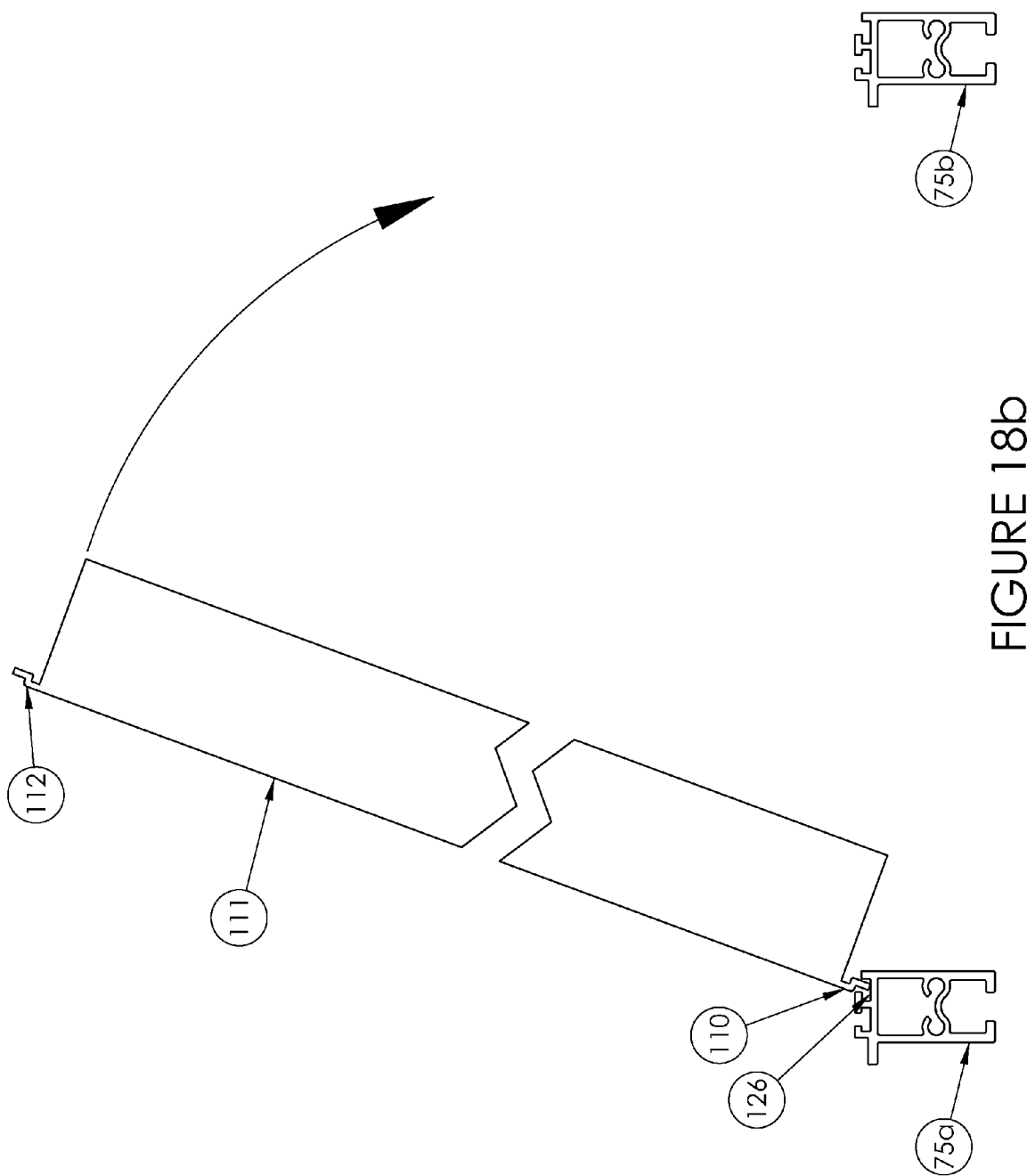
FIG. 18b is a schematic end view illustrating the attachment lip as shown in FIG. 18a in the initial insertion stage with the PV module inserted into the mating mounting rail.

FIGS. 18a and 18b illustrate the unique ability of the inventive mounting structure shown in FIG. 17 to simplify and expedite the mounting of the common PV array. The same roof structure 1 is shown in FIG. 18a as is depicted in FIGS. 1 and 2, and in the preferred application the attachment to the rafters 2 is made by locating a full length mounting channel 18 in line with a rafter 2 and attaching to the rafter 2 using a plurality of lag screw assemblies 5. A plurality of mounting channels 18 are spaced across the roof structure 1 per the required load calculations. The grid connector 20 of this invention is slid into the mounting channel 18 in quantities to match the connecting joints created by the crossing grid. Once the grid connectors 20 are in place, the mounting rail 75 (see FIG. 18b) is attached longitudinally across the roof structure 1 (in place of the assembly 19 described above).

In the embodiments of FIGS. 2-15, there are upper and lower mounting rails 18 and 19 at each edge of each row of PV panels 10. In the case of PV panels at the edge of the array, there is one panel inserted on one side of a mounting rail assembly 19. In the case of PV panels between the edges, the adjacent PV panels will share a common mounting rail assembly 19. As in the case of the apparatus of FIGS. 11a-15, an adjustable top cap 42 is inserted into the other assembly components to retain the PV panels in the assembly. The mounting rail assemblies 19 and 35 are spaced at a distance suited to receive the PV panels 10. With the invention illustrated in FIGS. 17-22, there is a modification to how the PV panels in the array are mounted to the foundation.

Figure 20:
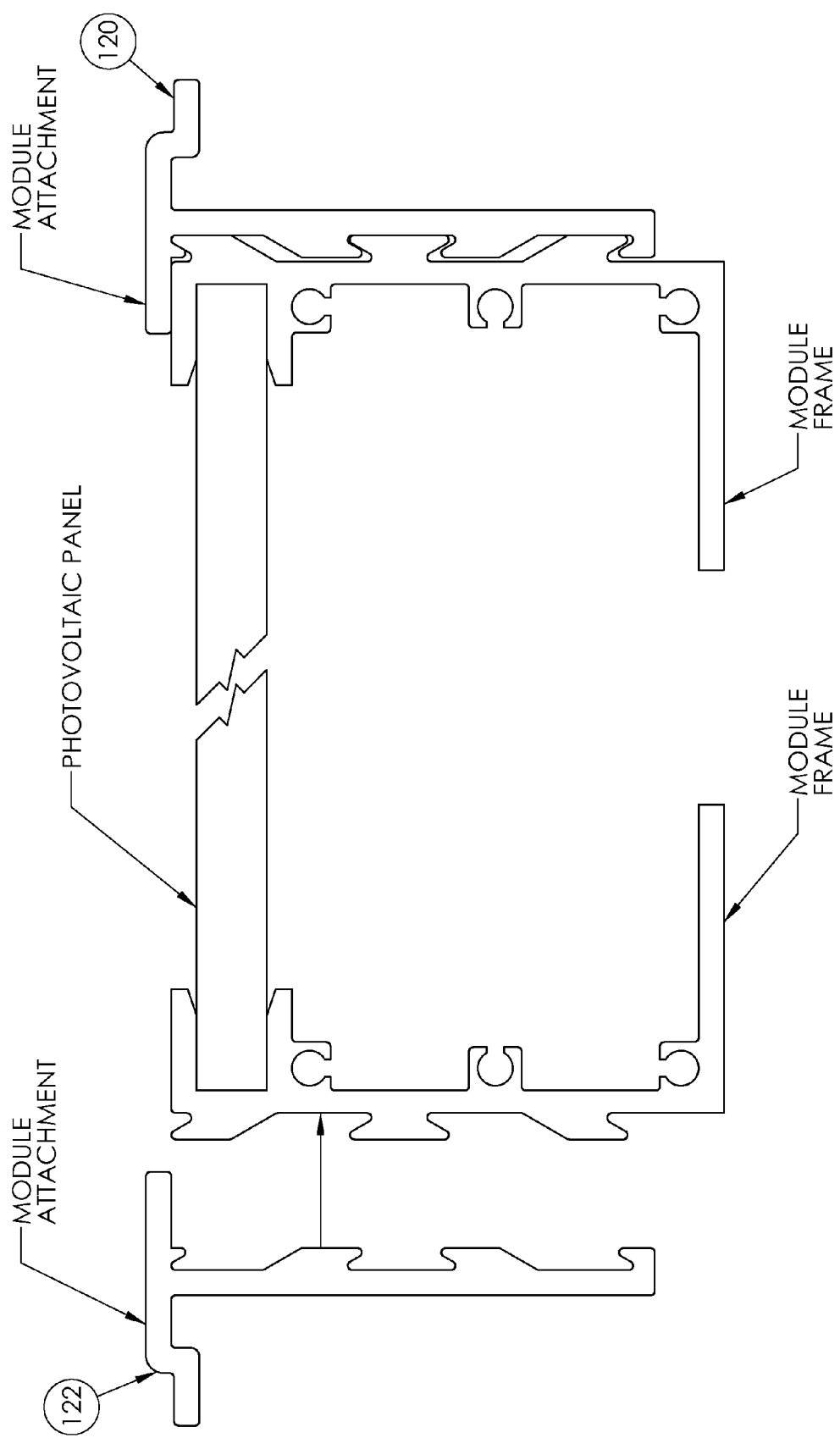
FIG. 20 is an end view in section illustrating a photovoltaic module with an alternative exterior extrusion that includes an extruded attachment lip to assist in mounting.
Figure 21:
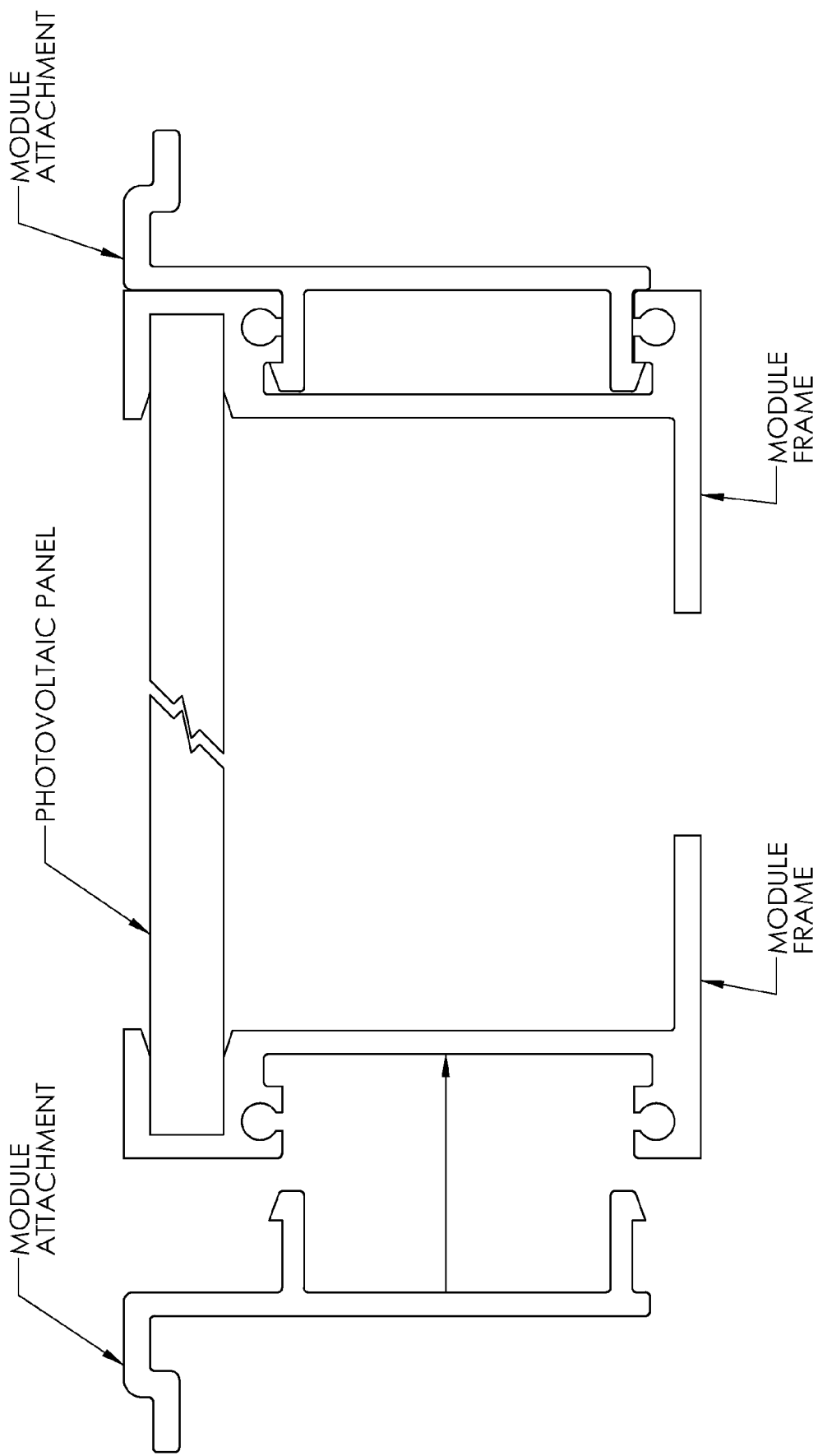
FIG. 21 is an end view in section illustrating a photovoltaic module with an alternative exterior extrusion that includes an extruded attachment lip to assist in mounting.
Figure 22:
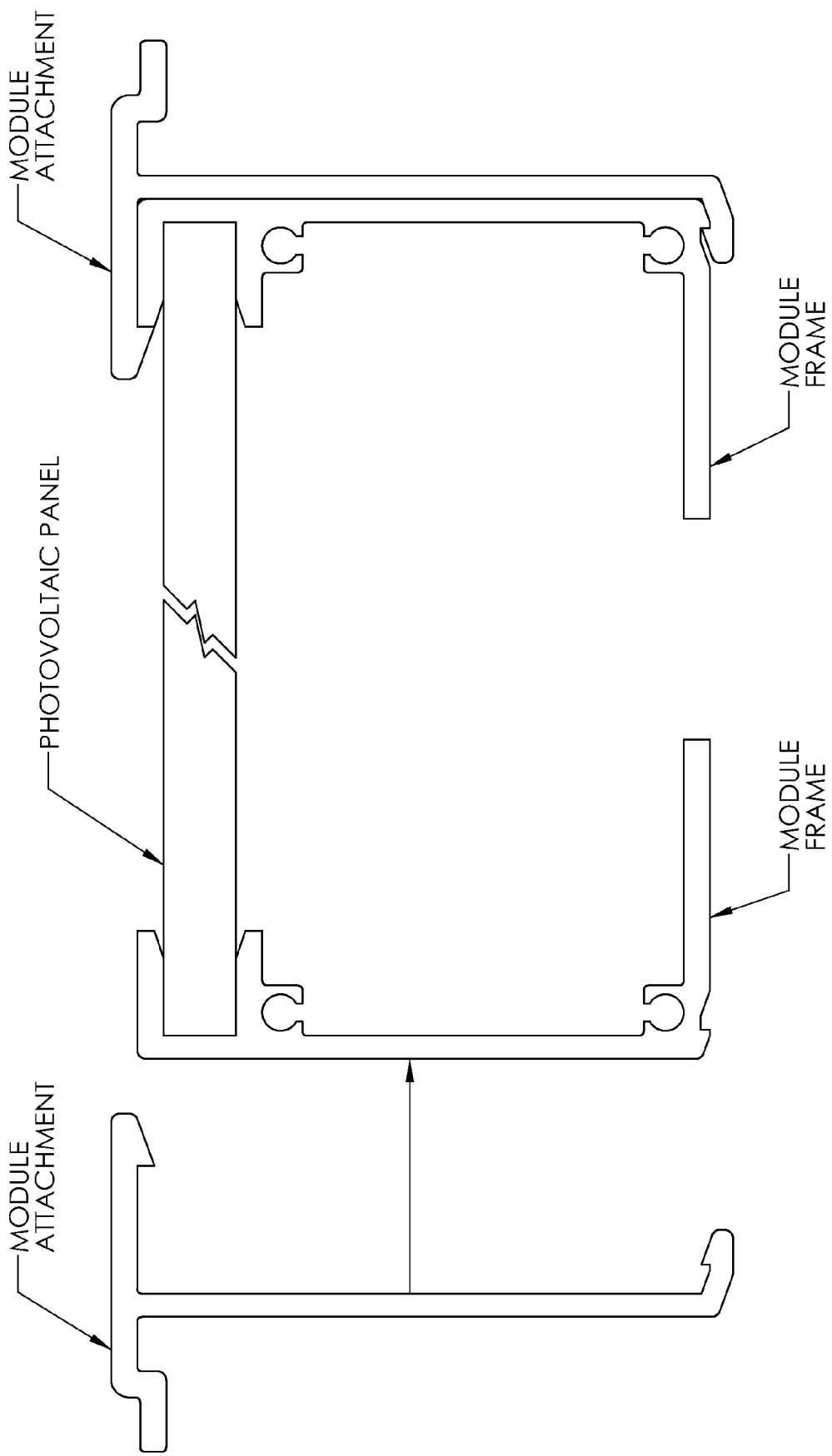
FIG. 22 is an end view in section illustrating a photovoltaic module with an alternative exterior extrusion that includes an extruded attachment lip to assist in mounting.

As discussed in relation to FIG. 17 above, edges of each PV module 111 have lips 110 and 112. The PV module 111 has a standard, commercially available PV panel affixed with special lips 110 and 112 that create a "hinge half" along one or many of its edges. The PV module 111 may also be of a custom nature that has the hinge half built into its frame as shown in FIG. 17, or it can be attached after manufacture as shown in the embodiments of FIGS. 20-22. As shown in detail in FIG. 18b, the lip 110 is inserted into the hinge slot 126 formed in the hinged mounting rail 75a when the PV module is held at an angle to the final position the module 111 will assume in the useable orientation (as shown in FIG. 18a). The PV module 111 is then pivoted along the arc shown in FIG. 18b until its opposing lip 112 rests upon the second mounting rail 75b, and the module 111 is thus lowered into its working position.

Figure 19:
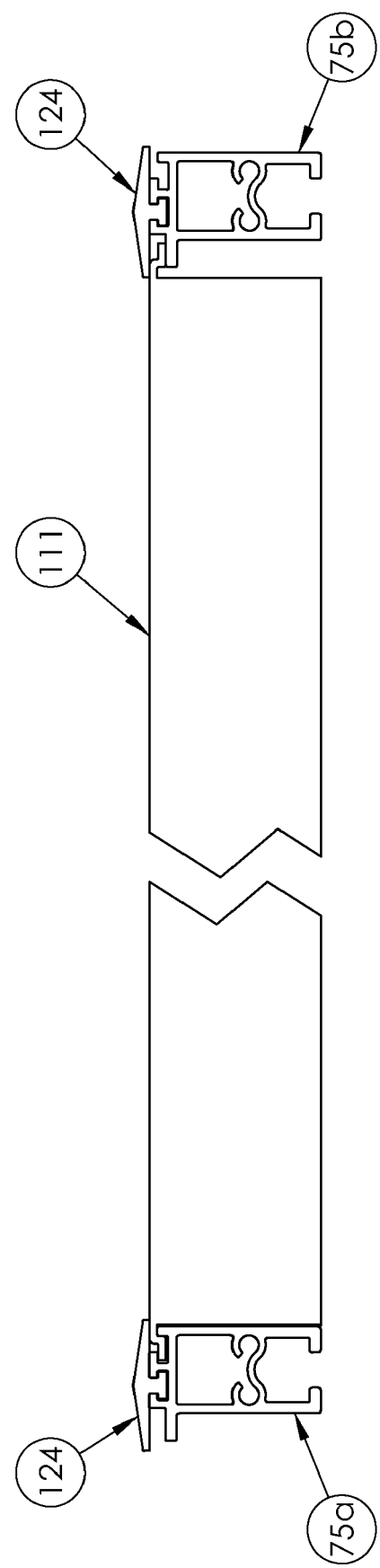
FIG. 19 is an end view in section illustrating a PV module in the working position and locked into position after insertion into the embodiment shown in FIGS. 18a and 18b.

The opposite lip 112 of the PV module 111 may be affixed with a similar hinge bracket or a fastener of an alternate configuration that supports the PV module 111. However, it is preferred that the lip 112 of the PV module be fixed to the rail 75b using conventional fasteners or, most preferably, a locking retainer cap 124 as shown in FIG. 19. It is apparent that the retainer cap 124 secures both the attachment lip 110 of the PV panel 111, and the opposing attachment lip 112 that is not inserted under a rigid rib on the rail 75a or 75b. The PV module 111 may hinge from either end or side, and lock from either end or side, and it is preferred that a retainer cap 124 be used on both rails 75a and 75b to lock the PV panel 111 securely to the foundation.

Referring to FIG. 19, the PV module 111 has been rotated to its working and locked position. The PV module 111 is locked in position using the locking retainer cap 124 that prevents the PV module 111 from coming out of its working position. The PV module 111 may also be locked into position using various fastener methods that would remain true to the purpose of the current invention.

FIG. 20 shows a unique encasement that forms an improved PV module frame. The added channels formed on the exterior of the frame allow for the PV module to be mounted by present practices, but also permit the frame to mate with the module attachments 120 and 122 as shown. The mating shapes formed on the module attachments 120 and 122 allows the module attachments 120 and 122 to mate and slide onto the frame exterior. The use of two opposing and parallel module attachments 120 and 122 provides the hinged mounting effect described above in association with FIGS. 17-19, but provides this feature as an option to be attached to a frame that can otherwise be used in a conventional manner. The unique attachment allows the PV modules to be mounted in either a portrait orientation or a landscape orientation as related to the mounting surface by sliding the module attachment extrusion on the short sides or the long sides of the PV module.

The FIG. 20 embodiment utilizes a slide-on attachment. In FIGS. 21 and 22, alternative embodiments of making the attachment to the module are shown. Both embodiments shown in FIGS. 21 and 22 have a snap-on variation. The inverted depression defined by the pair of opposing walls formed in the exterior profile of the FIG. 21 embodiment allows for the module to be mounted by present practices but primarily is disposed to be used as the mating section to an add on the module attachments. The unique profile provided by the module attachment allows the two profiles to mate and snap together in the manner shown on the right side of the FIG. 21 embodiment due to the engaging barbs on the cooperating legs of the module attachments. The use of two opposing and parallel module attachment extrusions provides the hinged mounting feature described in relation to the embodiments illustrated in FIGS. 17-20. The unique attachment method allows the PV modules to be mounted in either a portrait orientation or a landscape orientation, as related to the mounting surface, by snapping the module attachment extrusion on the short sides or the long sides of the PV module.

In FIG. 22 a slight depression is shown formed in the exterior profile to allow the module to be mounted by present practices but primarily to be used as the mating section to an add-on module attachment. The unique profile provided by the module attachment allows the two profiles to mate and snap together. The use of two opposing and parallel module attachment extrusions provides the hinged feature described above. The unique attachment method allows the PV modules to be mounted in either a portrait orientation or a landscape orientation as related to the mounting surface by snapping the module attachment extrusion on the short sides or the long sides of the PV module.

It should be noted that the complete system as demonstrated herein can be used in applications unrelated to the demonstrated roof mounting with the roof mounting channels 18 being substituted with various alternative configurations. For example, if mounted to a wall or to the ground, other substitute foundation fixtures should be used for installation.

It should also be noted that this system is adaptable for future changes within a PV array. If the PV panels are changed to a larger or smaller configuration, the uniqueness of the mounting system described herein allows easy removal of the PV module 10 or 111 by loosening the mounting rail assemblies 19, 35 or 75. The grid connectors 20 are then loosened, which allows the mounting rail assemblies to be repositioned on the roof or other structure to suit the size and shape of the new PV panels to be installed. Once the mounting rail assemblies are repositioned, the grid connectors may be retightened. The mounting rail assemblies are then retightened against the PV panels. The mounting channels 18 do not require alteration in most contemplated situations. The repositioning process may be repeated whenever needed in the future.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. Solar panel array mounting system, which comprises:
   (a) a series of base rails mountable to a surface in parallel relationship, each base rail having an upper slot;
   (b) a series of hinge rails disposable in parallel relationship perpendicularly to and above said series of base rails, each hinge rail having a lower slot and having upper retaining slots adapted to receive and retain tabs extending from solar panels; and
   (c) a cam-a-lock having a central I-bar having an upper head adapted to be retained within said hinge rail lower slot and a lower head adapted to be retained within said base rail upper slot, said central I-bar disposed within an inner sleeve having a threaded outer surface and disposed within an outer sleeve having an inner threaded surface in threading engagement with said inner sleeve outer threaded surface, whereby rotating said inner sleeve and outer sleeve with respect to each other tightens or looses said base rails to said hinge rails;

whereby solar panels can be installed to said hinge rails by insertion of their tabs into said hinge rail upper slots.

* * * * *